(12) United States Patent
Brinkman et al.

(10) Patent No.: US 12,187,959 B2
(45) Date of Patent: Jan. 7, 2025

(54) EMULSION POLYMERS AND METHODS FOR IMPROVING PUMPABILITY

(71) Applicant: ChampionX USA Inc., Sugar Land, TX (US)

(72) Inventors: Kerry Charles Brinkman, Sugar Land, TX (US); Izabela A. Owsik, College Station, TX (US); Chad Gilmer, Richmond, TX (US); Anoop Chengara, Iowa Colony, TX (US); Pious Kurian, Sugar Land, TX (US); Tri T. Phan, Sugar Land, TX (US); Jeremy Moloney, Katy, TX (US); Michael Cash, Richmond, TX (US)

(73) Assignee: ChampionX LLC, Sugar Land, TX (US)

( * ) Notice: Subject to any disclaimer, the term of this patent is extended or adjusted under 35 U.S.C. 154(b) by 0 days.

(21) Appl. No.: 18/361,113

(22) Filed: Jul. 28, 2023

(65) Prior Publication Data

US 2024/0034922 A1 Feb. 1, 2024

Related U.S. Application Data

(60) Provisional application No. 63/369,895, filed on Jul. 29, 2022.

(51) Int. Cl.
*C09K 8/524* (2006.01)
*C09K 8/54* (2006.01)

(52) U.S. Cl.
CPC ............... *C09K 8/524* (2013.01); *C09K 8/54* (2013.01); *C09K 2208/22* (2013.01);
(Continued)

(58) Field of Classification Search
None
See application file for complete search history.

(56) References Cited

U.S. PATENT DOCUMENTS

| 2,281,613 | A | 5/1942 | Wollthan et al. |
| 3,542,044 | A | 11/1970 | Hansen et al. |

(Continued)

FOREIGN PATENT DOCUMENTS

| CN | 101338185 A | 1/2009 |
| CN | 103498653 A | 1/2014 |

(Continued)

OTHER PUBLICATIONS

Omer, Ali et al., Effects of Surfactant and Water Concentrations on Pipeline Flow of Emulsions, Industrial & Engineering Chemistry Research, 2013, 52, pp. 9099-9105.

(Continued)

*Primary Examiner* — John J Figueroa
(74) *Attorney, Agent, or Firm* — Stinson LLP

(57) ABSTRACT

A polymer composition has been developed that comprising an oil-in-water emulsion comprising an aqueous phase comprising water and an emulsifying surfactant having a cloud point of less than 80° C. and a hydrophilic-lipophilic balance (HLB) of greater than or equal to 8, and an oil phase comprising a high molecular weight oil-soluble polymer, wherein the oil-soluble polymer comprises a copolymer derived from reaction of a hydrophobic monomer and an ionizable monomer in a weight ratio from about 999:1 to about 80:20. Methods of using the compositions for drag reduction and corrosion inhibition are also disclosed.

20 Claims, 4 Drawing Sheets

(52) U.S. Cl.
CPC ...... *C09K 2208/28* (2013.01); *C09K 2208/32* (2013.01); *C09K 2208/34* (2013.01)

(56) References Cited

U.S. PATENT DOCUMENTS

| | | | |
|---|---|---|---|
| 3,624,019 | A | 11/1971 | Anderson et al. |
| 3,654,994 | A | 4/1972 | Slagel et al. |
| 3,793,218 | A | 2/1974 | Canevari |
| 3,857,402 | A | 12/1974 | Schuh |
| 4,068,676 | A | 1/1978 | Thorn et al. |
| 4,212,312 | A | 7/1980 | Titus |
| 4,332,692 | A | 6/1982 | Payne et al. |
| 4,881,566 | A | 11/1989 | Ubels et al. |
| 5,244,937 | A | 9/1993 | Lee et al. |
| 5,539,044 | A | 7/1996 | Dindi et al. |
| 6,162,850 | A | 12/2000 | Boucher et al. |
| 7,285,582 | B2 | 10/2007 | Harris et al. |
| 7,361,628 | B2 | 4/2008 | Milligan et al. |
| 7,468,402 | B2 | 12/2008 | Yang et al. |
| 7,598,333 | B1 | 10/2009 | Burden et al. |
| 7,884,144 | B2 | 2/2011 | Smith et al. |
| 8,022,118 | B2 | 9/2011 | Milligan et al. |
| 8,101,045 | B2 | 1/2012 | Furman et al. |
| 8,124,673 | B2 | 2/2012 | Burden et al. |
| 8,148,303 | B2 | 4/2012 | Van Zanten et al. |
| 8,884,049 | B2 | 11/2014 | Li et al. |
| 9,193,898 | B2 | 11/2015 | Chang et al. |
| 9,290,620 | B2 | 3/2016 | Li et al. |
| 9,528,044 | B2 | 12/2016 | Van Zanten et al. |
| 9,644,161 | B2 | 5/2017 | Kommareddi et al. |
| 9,676,878 | B2 | 6/2017 | Bao et al. |
| 9,783,644 | B2 | 10/2017 | Burden et al. |
| 9,939,113 | B2 | 4/2018 | Olechnowicz et al. |
| 9,982,184 | B2 | 5/2018 | Jones |
| 10,053,595 | B2 | 8/2018 | Johnston et al. |
| 10,316,118 | B2 | 6/2019 | Bao et al. |
| 2002/0173587 | A1 | 11/2002 | Lamola et al. |
| 2003/0017953 | A1 | 1/2003 | Horton et al. |
| 2005/0049327 | A1 | 3/2005 | Jovancicevic et al. |
| 2006/0144595 | A1 | 7/2006 | Milligan et al. |
| 2006/0148928 | A1 | 7/2006 | Harris et al. |
| 2007/0284110 | A1 | 12/2007 | Harris et al. |
| 2008/0023071 | A1 | 1/2008 | Smith et al. |
| 2009/0111714 | A1 | 4/2009 | Burden et al. |
| 2009/0239958 | A1 | 9/2009 | Sakanishi et al. |
| 2011/0132466 | A1 | 6/2011 | Bucher |
| 2011/0256085 | A1 | 10/2011 | Talingting Pabalan et al. |
| 2012/0097389 | A1 | 4/2012 | Dwarakanath et al. |
| 2012/0298209 | A1 | 11/2012 | Milligan et al. |
| 2013/0037118 | A1 | 2/2013 | Bao et al. |
| 2013/0324443 | A1* | 12/2013 | Wang ................ C04B 24/2688 166/305.1 |
| 2014/0158360 | A1 | 6/2014 | Halliday et al. |
| 2016/0032170 | A1* | 2/2016 | Li ........................ C09K 8/588 166/305.1 |
| 2016/0122622 | A1 | 5/2016 | Dwarakanath et al. |
| 2016/0281934 | A1 | 9/2016 | Olechnowicz et al. |
| 2017/0009027 | A1 | 1/2017 | Harris, Jr. et al. |
| 2017/0037299 | A1 | 2/2017 | Li et al. |
| 2017/0096597 | A1 | 4/2017 | Hu et al. |
| 2017/0121590 | A1 | 5/2017 | Lopez et al. |
| 2017/0158947 | A1 | 6/2017 | Kim et al. |
| 2018/0002626 | A1 | 1/2018 | Potisek et al. |
| 2018/0112126 | A1 | 4/2018 | Yang et al. |
| 2018/0305601 | A1 | 10/2018 | Champagne et al. |
| 2020/0299561 | A1* | 9/2020 | Sudur Zalluhoglu .. C09K 8/035 |
| 2020/0308390 | A1* | 10/2020 | Phan ...................... C08L 33/10 |
| 2021/0095183 | A1* | 4/2021 | Li .......................... C09K 8/588 |

FOREIGN PATENT DOCUMENTS

| | | |
|---|---|---|
| CN | 107011508 A | 8/2017 |
| EP | 1936189 B1 | 2/2011 |
| EP | 2 853 801 A1 | 4/2015 |
| GB | 2131067 A | 6/1984 |
| WO | 9101362 A1 | 2/1991 |
| WO | 93/11361 | 6/1993 |
| WO | 2004/016947 A1 | 2/2004 |
| WO | 2012/006781 A1 | 1/2012 |
| WO | 2012/067818 A1 | 5/2012 |
| WO | 2016/011106 A1 | 1/2016 |
| WO | 2020198741 A1 | 10/2020 |
| WO | 2021094174 A1 | 5/2021 |

OTHER PUBLICATIONS

Abdullah, Al-Yaari, Mohammed, Thesis on Influence of Drag Reducing Polymers on Oil-Water Flow Characteristics, King Fahd University of Petroleum & Minerals, Jun. 2008, 137 pages.

Marszall, L., Cloud Point and Emulsion Inversion Point in the Presence of Additives, Journal of Colloid and Interface Science, vol. 59, No. 2, Apr. 1977, 2 pages.

Schott, Hans et al., Effect of Inorganic Additives on Solutions of Nonionic Surfactants, VII. Suspension Stability, Colloids and Surfaces, 19 (1986), pp. 399-418.

Al-Hashmi, A.R. et al., Transportation of heavy oils using polymer-stabilized oil-in-water emulsions, J. Petrol Explor Prod Technol (2017) 7:881-890.

Ramsey, WB, Research Document CAL-2982 (Calgon Corporation), WCL-762 Process Development, Nov. 20, 1975, 16 pages.

Hunter, WE et al., Research Document CAL-2514 (Calgon Corporation), Polymerization of 2-Ethylhexylmethacrylate Oil Soluble Friction Reducer, Apr. 16, 1980, 20 pages.

Farley, DE, Research Document CAL-2983 (Calgon Corporation), Drag Reduction in Nonaqueous Solutions: Structure Property Correlation for Poly(Isodecyl Methacrylate), Date Unknown, 28 pages.

Farley, DE, Research Document CAL-3668 (Calgon Corporation), Progress Report Oil Soluble Gelling Agent, Jan. 6, 1972, 14 pages.

Sherwood, NS, Research Document CAL-3774 (Calgon Corporation), IDMA Copolymers—Oil Friction Reduction, Jan. 12, 1972, 3 pages.

Persinski, LZJ, Research Document CAL-3778 (Calgon Corporation), Soloid/Oil-Soluble Friction Reducer, Oct. 28, 1977, 3 pages.

Sherwood, NS, Research Document CAL-3779 (Calgon Corporation), Oil Soluble Friction Reducers, Feb. 10, 1978, 5 pages.

* cited by examiner

EMULSION POLYMERS AND METHODS FOR IMPROVING PUMPABILITY

CROSS REFERENCE TO RELATED APPLICATIONS

This patent application claims the benefit of U.S. Provisional Patent Application No. 63/369,895, filed Jul. 29, 2022; the entire disclosure of which is incorporated herein by reference.

FIELD

A polymer composition has been developed that comprising an oil-in-water emulsion comprising an aqueous phase comprising water and an emulsifying surfactant having a cloud point of less than 80° C. and a hydrophilic-lipophilic balance (HLB) of greater than or equal to 8, and an oil phase comprising a high molecular weight oil-soluble polymer, wherein the oil-soluble polymer comprises a copolymer derived from reaction of a hydrophobic monomer and an ionizable monomer in a weight ratio from about 999:1 to about 80:20. Methods of using the compositions for drag reduction and corrosion inhibition are also disclosed.

BACKGROUND

Solving the problem of agglomeration and deposit formation when pumping emulsion polymers has been a known problem. Additionally, a variety of solutions have been proposed including the incorporation of plasticizers into the solid polymer particles; adding diesters and triesters of diols and polyols for improving injection of drag reducers; adding kerosene, heptane and isooctane to emulsion formulations to reduce deposit formation in pumps; using core-shell emulsion polymers having an amphiphilic shell that reduces the film-forming tendencies of the core polymer; and the use of barrier materials applied to surfaces in diaphragm pumps to reduce deposit formation caused by emulsions and the subsequent blockage of check valves.

One problem with using solvents or plasticizer to reduce pump deposits is their negative impact upon emulsion stability. The addition of hydrocarbons such as kerosene or light mineral oils into the polymer matrix will soften the polymer. Too much will begin to invert the emulsion and encourage agglomeration of the particles. This is particularly true when a relatively low-HLB surfactant system has been chosen to allow for fast inversion of the emulsion. Other additives can also interfere with alcohol and ester-based solvents and plasticizers added as deposit-reducing aids. Again, aggregation can occur in the fully formulated emulsion.

Core-shell emulsion polymers with an amphiphilic shell are likely useful for reducing deposit formation in pumps. They suffer from the manufacturing complexity of two separate polymerization steps and risk forming a shell that is too stable and inhibits inversion.

There are very few pump designs that can produce pressures of 10,000 psi or greater. Pneumatic plunger pumps are most commonly used on offshore platforms to pump additives down an umbilical to the seafloor. With drag reducing agent (DRA) emulsions, polymer particle aggregation occurs at the intersection of the plunger and the -elastomer seal to form deposits. The elastomer may be acting as a catalytic surface to facilitate binding of the sticky particles. A complex surface coating may not be practical in a plunger pump.

Thus, the known solutions are inadequate to combat pump deposit formation.

BRIEF SUMMARY

This disclosure is directed to a polymer composition comprising an oil-in-water emulsion comprising an aqueous phase comprising water and an emulsifying surfactant having a cloud point of less than 80° C. and a hydrophilic-lipophilic balance (HLB) of greater than or equal to 8, and other optional water-soluble components, and an oil phase comprising a high molecular weight oil-soluble polymer, wherein the oil-soluble polymer comprises a copolymer derived from reaction of a hydrophobic monomer and an ionizable monomer in a weight ratio from about 999:1 to about 80:20.

The disclosure also teaches methods of delivering the polymer compositions disclosed herein to a hydrocarbon composition recovered from a hydrocarbon-containing subterranean formation comprising transporting the polymer composition through a fluid conduit, wherein the viscosity of the polymer composition is less than 500 centipoise in the fluid conduit and the oil-soluble polymer begins being released from the emulsion within 30 minutes of contacting the hydrocarbon composition.

Additionally, methods of inhibiting corrosion at a surface are disclosed. The methods comprise contacting the surface with an effective amount of the polymer compositions disclosed herein or adding the polymer compositions disclosed herein to a fluid which contacts the surface thereby inhibiting corrosion on the surface.

Other objects and features will be in part apparent and in part pointed out hereinafter.

BRIEF DESCRIPTION OF THE SEVERAL VIEWS OF THE DRAWING

Corresponding reference characters indicate corresponding parts throughout the drawings.

DETAILED DESCRIPTION

Figure 1:
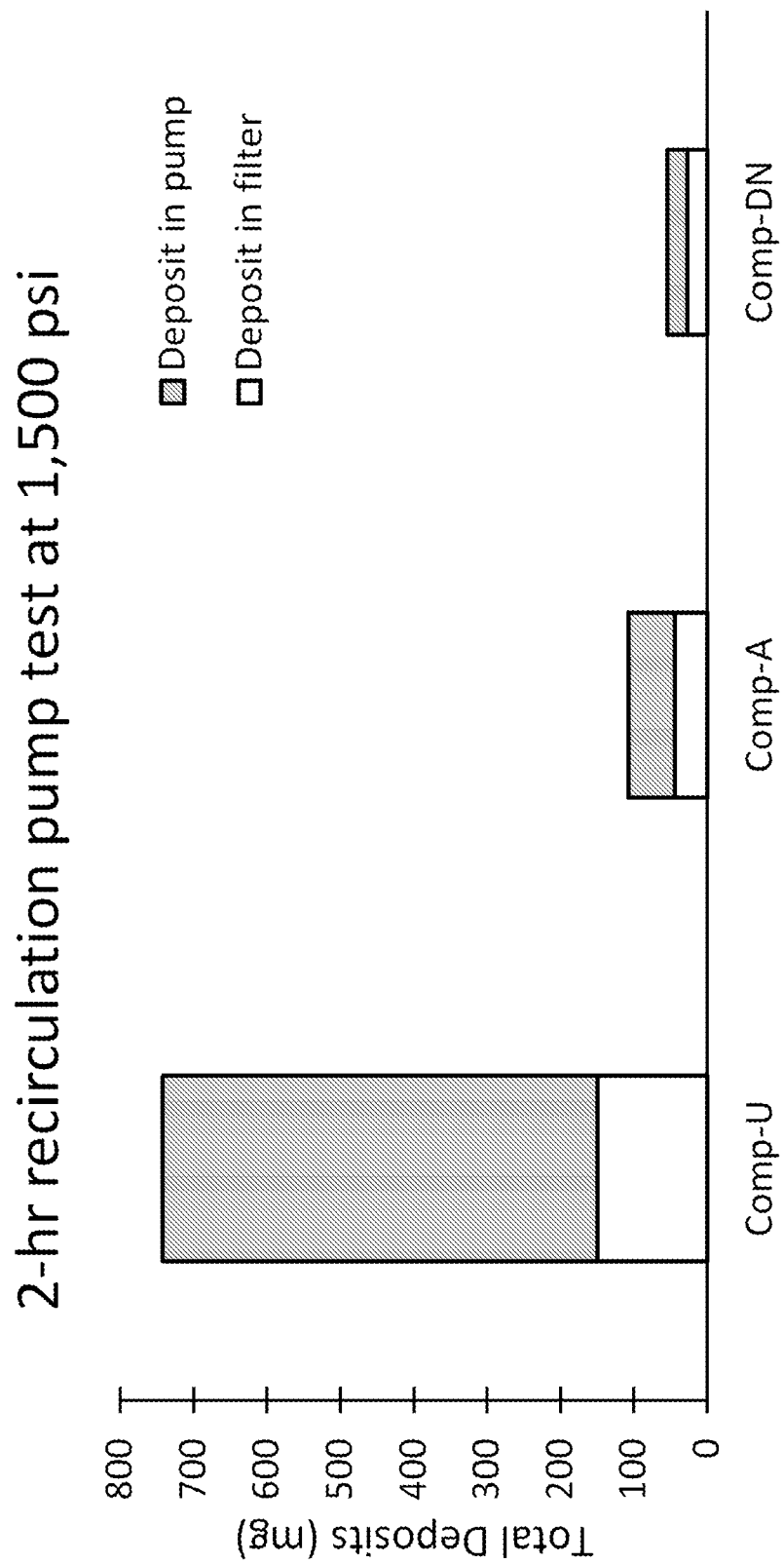
FIG. 1 shows a graph of deposits collected from a 2 hour recirculation pump test at 1,500 pounds per square inch (psi) using a 500 g sample.

Water-external emulsion polymers are sensitive to agglomeration when subject to the shear and compression experienced inside pumps. The situation becomes worse as the pumping pressure increases and the pump can quickly become inoperable due deposit interference with the check valves. The compositions described herein include copolymers of hydrophobic monomers and one or more charged monomers substantially reduces the tendency for the particles to agglomerate when being pumped due to the increase in the ionic repulsion between particles when the charged monomers incorporated onto the emulsion polymer backbone. This is especially important when the emulsion polymer is being applied through a very long, narrow conduit to the application point and pressures of 1,000 psi or higher are required to achieve a sufficient flow rate. An example of such an application would be pumping an emulsion containing very high molecular weight polymer particles through an umbilical tube to a seafloor pipeline with the intent of reducing the flow turbulence within that pipeline.

An emulsion that is effective for reducing turbulence in subsea crude oil pipelines must have several attributes. First, it must be storage stable within a temperature range of about −6° C. to 50° C. without the polymer particles aggregating or phase-separating. Second, it must have a viscosity below about 200 cP at 40° F. (4.4° C.) to facilitate being pumped through miles of narrow tubing at hundreds of gallons per day. Third, it must be stable when being pumped at pressures up to 15,000 pounds per square inch (psi) without forming excessive deposits that would foul check valves, blind filters, or even block the umbilical tube. The emulsion must also be compatible with the pump seal such that minimal seal erosion occurs. Fourth, the external phase of the emulsion should contain sufficient hydrate-inhibiting alcohol or glycol solvents to prevent the water from forming methane gas hydrates in the umbilical if natural gas were to back-flow into the emulsion line. Fifth, the emulsion must invert quickly and release the polymer into the crude oil to provide the drag-reducing effect. This can be a particularly challenging requirement. Sixth, the polymer must be present in a sufficiently high concentration within the emulsion and with very high molecular weight to reduce turbulence but without degrading too quickly by polymer chain scission. Thus, an effective formula can be a compromise of many competing priorities.

Moreover, incorporating ionic functionality into the polymer backbone increases the zeta potential at the particle surface and stabilizes the colloidal suspension. The increased zeta potential increases the energy barrier for aggregation of the particles and reduces deposit formation in pumps. Also, while all ionic monomers improve emulsion stability, not all ionic monomers are equally suitable for use in drag reduction applications. A key DRA requirement is fast inversion and release of the polymer into crude oil. Some ionic functional groups impart great stability but prevent the emulsion from inverting within a timeframe useful for a DRA. Also, the ionic monomer must have sufficient lipophilicity such that it will form a copolymer with an alkyl (meth)acrylate monomer. If the ionic monomer is too hydrophilic, it will simply homopolymerize in the external phase and not incorporate into the DRA polymer.

Polymer compositions are disclosed that can be used in methods of delivering the polymer to various hydrocarbon fluids recovered from a hydrocarbon-containing subterranean formation. The polymer compositions are stable upon transport and storage and in the umbilical line. Stated another way, the polymer compositions described herein contain stable emulsions and the emulsions have an advantageous particle size such that the polymer compositions do not develop a disadvantageous viscosity or precipitate to plug the umbilical line. After being contacted with the hydrocarbon fluid extracted from the hydrocarbon-containing subterranean reservoir, the polymer in the oil-in-water emulsion is released in to the hydrocarbon fluid in a time sufficient to reduce the drag or turbulent forces of the flowing hydrocarbon fluid.

Also disclosed are polymer compositions comprising an oil-in-water emulsion comprising an aqueous phase comprising water and an emulsifying surfactant having a cloud point of less than 80° C. and a hydrophilic-lipophilic balance (HLB) of greater than or equal to 8, and an oil phase comprising a high molecular weight oil-soluble polymer, wherein the oil-soluble polymer comprises a copolymer derived from reaction of a hydrophobic monomer and an ionizable monomer in a weight ratio from about 999:1 to about 80:20.

The polymer compositions described herein can have the oil-soluble polymer comprises a copolymer derived from reaction of a hydrophobic monomer and an ionizable monomer in a weight ratio from about 999:1 to about 99:1; from about 99:1 to about 80:20; from about 90:10 to about 80:20; from about 99:1 to about 85:15; from about 90:10 to about 85:15; or from about 99:1 to about 90:10.

Additionally, the polymer compositions can have the molecular weight of the oil-soluble polymer is greater than about 1,000,000 Daltons as measured by gel permeation chromatograph (GPC) as compared to a polystyrene standard or from about 5,000,000 Daltons to about 50,000,000 Daltons.

The polymer compositions can have the oil-soluble polymer have a molecular weight of from about 1,000,000 Daltons to about 200,000,000 Daltons, from about 2,000,000 Daltons to about 200,000,000 Daltons, from about 3,000,000 Daltons to about 200,000,000 Daltons, from about 4,000,000 Daltons to about 200,000,000 Daltons, from about 5,000,000 Daltons to about 200,000,000 Daltons, from about 1,000,000 Daltons to about 100,000,000 Daltons, from about 2,000,000 Daltons to about 100,000,000 Daltons, from about 3,000,000 Daltons to about 100,000,000 Daltons, from about 4,000,000 Daltons to about 100,000,000 Daltons, from about 5,000,000 Daltons to about 100,000,000 Daltons, from about 1,000,000 Daltons to about 50,000,000 Daltons, from about 2,000,000 Daltons to about 50,000,000 Daltons, from about 3,000,000 Daltons to about 50,000,000 Daltons, from about 4,000,000 Daltons to about 50,000,000 Daltons, or from about 5,000,000 Daltons to about 50,000,000 Daltons as measured by gel permeation chromatography (GPC) against a polystyrene standard.

The polymer compositions can have the ionizable monomer comprise a styrene sulfonate, styrene sulfonic acid, a vinyl sulfonate, a vinyl sulfonic acid, an acrylamide alkyl sulfonic acid, an acrylamide alkyl sulfonate, a methacrylamide alkyl sulfonic acid, a methacrylamide alkyl sulfonate, a dialkylaminoalkyl methacrylate, a dialkylaminoalkyl acrylate, a dialkylaminoalkyl methacrylamide, a dialkylaminoalkyl acrylamine, or a combination thereof; particularly, the ionizable monomer comprises a styrene sulfonate, a vinyl sulfonate, an acrylamide alkyl sulfonic acid, an acrylamide alkyl sulfonate, a methacrylamide alkyl sulfonic acid, a methacrylamide alkyl sulfonate, or a combination thereof; more particularly, the ionizable monomer comprises a dialkylaminoalkyl methacrylate, a dialkylaminoalkyl acrylate, a dialkylaminoalkyl methacrylamide, a dialkylaminoalkyl acrylamine, or a combination thereof.

Additionally, the polymer compositions can have the ionizable monomer comprise styrene sulfonate, styrene sulfonic acid, acrylamide tert-butyl sulfonic acid (ATBS), acrylamide tert-butyl sulfonate, methacrylamide tert-butyl sulfonic acid, methacrylamide tert-butyl sulfonate, dimethylaminoethyl methacrylate, dimethylaminoethyl acrylate, dimethylaminoethyl methacrylamide, dimethylaminoethyl acrylamine, or a combination thereof. Preferably, the ionizable monomer comprises styrene sulfonate, styrene sulfonic acid, acrylamine tert-butyl sulfonic acid (ATBS), methylaminoethyl methacrylamide, or a combination thereof.

The polymer compositions described herein can have the hydrophobic monomer comprise propyl acrylate, propyl methacrylate, butyl acrylate, butyl methacrylate, iso-butyl acrylate, iso-butyl methacrylate, tert-butyl acrylate, tert-butyl methacrylate, pentyl acrylate, pentyl methacrylate, isopentyl acrylate, isopentyl methacrylate, hexyl acrylate, hexyl methacrylate, cyclohexyl acrylate, cyclohexyl methacrylate, heptyl acrylate, heptyl methacrylate, octyl acrylate, octyl methacrylate, iso-octyl acrylate, iso-octyl methacrylate, iso-decyl acrylate, iso-decyl methacrylate, lauryl acrylate, lauryl methacrylate, stearyl acrylate, stearyl methacrylate, behenyl acrylate, behenyl methacrylate, 2-ethylhexyl acrylate, 2-ethylhexyl methacrylate, 2-propylheptyl acrylate, 2-propylheptyl methacrylate, benzyl acrylate, benzyl methacrylate, 2-phenylethyl acrylate, 2-phenylethyl methacrylate, tridecyl acrylate, tridecyl methacrylate, iso-bornyl acrylate, iso-bornyl methacrylate, 3,5,5-trimethylhexyl acrylate, 3,5,5-trimethylhexyl methacrylate, 3,3,5-trimethylcyclohexyl acrylate, 3,3,5-trim ethylcyclohexyl methacrylate, 2-hydroxyethyl acrylate, 2-hydroxyethyl methacrylate, 2-hydroxypropyl acrylate, 2-hydroxypropyl methacrylate, 2-hydroxybutyl acrylate, 2-hydroxybutyl methacrylate, 2-hydroxyethylcaprolactone acrylate, 2-hydroxyethylcaprolactone methacrylate, dihydrodicyclopentadienyl acrylate, dihydrodicyclopentadienyl methacrylate, ethyldiglycol acrylate, ethyldiglycol methacrylate, $C_{17}$ acrylate, $C_{17}$ methacrylate, vinylbenzylpolyoxyethylene alkyl ether, polyoxyethylene alkyl acrylate, polyoxyethylene alkyl methacrylate, styrene, or a combination or isomeric form thereof; more particularly, the hydrophobic monomer comprises 2-ethylhexyl methacrylate, 2-ethylhexyl acrylate, styrene, or a combination thereof.

Incorporation of three ionic co-monomers into the oil-soluble polymer is effective at reducing deposit formation when pumping the subsequent polymer emulsion while still allowing the emulsion to invert rapidly. These include ATBS (AMPS) acid and its salts, DMAEM and its salts, and styrene sulfonic acid and its salts. ATBS signifies acrylamido tert-butyl sulfonic acid. DMAEM signifies dimethylaminoethyl (meth)acrylate. Styrene sulfonic acid is also known as 4-vinyl benzene sulfonic acid. Advantageously, these monomers are added to the reactor prior to the initiation of polymerization but may be added to the on-going polymerization at any time up to completion of the polymerization.

The ATBS acid may be polymerized with the non-ionic lipophilic monomers at a concentration of 1 to 10% by weight of polymer. It may be polymerized as a salt but is preferably copolymerized in the acid form and converted to a salt after the polymerization is complete.

The DMAEM may be polymerized with the non-ionic lipophilic monomers at a concentration of 1 to 10% by weight of polymer. It may be polymerized in its neutral form but is preferably copolymerized as a salt with an organic acid. Pentanoic acid is an advantageous organic acid for salting the amine group.

The styrene sulfonic acid may be polymerized with the non-ionic lipophilic monomers at a concentration of 0.1 to 10% by weight of polymer. It may be polymerized in its neutral form but is advantageously copolymerized as the salt of an inorganic or organic base.

The non-ionic lipophilic monomers may be any oil-soluble monomers that are capable of polymerizing to a molecular weight that exceeds 5,000,000 Daltons and, preferably, exceeds 10,000,000 Daltons. These vinyl monomers preferably contain an alkyl side-chain with from 4 to 22 carbons; particularly, 2-ethylhexyl methacrylate.

The polymer compositions can have the oil-soluble polymer having a concentration of from about 2 wt. % to about 75 wt. %, from about 2 wt. % to about 60 wt. %, from about 2 wt. % to about 50 wt. %, from about 2 wt. % to about 40 wt. %, from about 2 wt. % to about 30 wt. %, from about 10 wt. % to about 75 wt. %, from about 10 wt. % to about 60 wt. %, from about 10 wt. % to about 50 wt. %, from about 10 wt. % to about 40 wt. %, from about 10 wt. % to about 30 wt. %, from about 20 wt. % to about 75 wt. %, from about 20 wt. % to about 60 wt. %, from about 20 wt. % to about 50 wt. %, from about 20 wt. % to about 40 wt. %, from about 20 wt. % to about 30 wt. %, or from about 20 wt. % to about 45 wt. % in the polymer composition, based on the amount of the oil-soluble polymer, emulsifying surfactant, and water.

For the emulsion polymerization, ethylenediamine tetraacetic acid or tetraacetic acid disodium salt is dissolved in deionized (DI) water and an antifoaming agent and a temperature-sensitive surfactant is mixed in a beaker until it is a homogenous mixture. The homogeneous mixture is poured into a nitrogen-purged reactor. Alternatively, these steps could be completed in one reactor using selected addition and appropriate stirring.

The stir speed is set at 200 RPM to 800 RPM and the temperature control to about 21 to 25° C. The monomer (e.g., ethylhexyl methacrylate (EHMA)) is then added to the reactor and the reaction mixture is purged with nitrogen at a sufficient rate to reduce the oxygen concentration to the desired value in the reaction mixture.

After the reaction mixture is purged with nitrogen for 15 to 60 minutes at 21 to 25° C., a sample of the mixture is collected and its density is measured. After the sample is collected, the initiator system is added slowly over 1.5 to 3.5 hours until the conversion of monomer to polymer reaches 95% as determined by the density measurement. This process is followed by increasing the initiator feed rate to 30 times faster for the post-treatment period.

After the initiator addition is completed, the reaction is allowed to continue for another 15 to 45 minutes. The reaction is stopped, the gel number is measured with a 100 mesh filter, the product is filtered, and the final density and RSV at 1000 ppm in kerosene is measured.

The emulsion polymerization can also use a polymer initiation system. For example, the initiation system can generate free radicals that facilitate the emulsion polymerization. The initiators can include persulfates (e.g., ammonium persulfate, sodium persulfate, potassium persulfate), peroxy persulfates, and peroxides (e.g., tert-butyl hydroperoxide) used alone or in combination with a reducing component or accelerator. The reducing components include bisulfites, metabisulfites, ascorbic acid, erythorbic acid, and sodium formaldehyde sulfoxylate. The accelerators can include a composition containing a transition metal with two oxidation states, such as ferrous sulfate and ferrous ammonium sulfate.

Alternatively, known thermal and radiation initiation techniques can be employed to generate the free radicals. Thermal initiators include sodium persulfate (SPS), ammonium persulfate, and potassium persulfate, 2,2'-azobis[2-(2-imidazolin-2-yl)propane]dihydrochloride (VA-044), or a combination thereof.

The oil-in-water emulsion droplets or particles (e.g., colloidal particle size of the polymer) of the oil phase can have a particle size from about 5 nm to about 10 μm, about 5 nm to about 5 μm, from about 5 nm to about 3 μm, from about 5 nm to about 1 μm, from about 5 nm to about 750 nm, from about 5 nm to about 500 nm, from about 5 nm to about 250 nm, from about 25 nm to about 10 μm, from about 25 nm to about 5 μm, from about 25 nm to about 3 μm, from about 25 nm to about 1 μm, from about 25 nm to about 750 nm, from about 25 nm to about 500 nm, from about 25 nm to about 250 nm, from about 50 nm to about 5 μm, from about 50 nm to about 3 μm, from about 50 nm to about 1 μm, from about 50 nm to about 750 nm, from about 50 nm to about 500 nm, or from about 50 nm to about 250 nm. Preferably, the oil-in-water emulsion droplets or particles can have a particle size from about 50 nm to about 250 nm.

In addition to the polymer composition, components in the DRA emulsion package are required to achieve full effectiveness. The DRA emulsion polymer composition includes the surfactant package of the emulsion, dispersant additives, seal lubricant additives, hydrate inhibitors, and viscosity modifiers.

An important component of the DRA package is the surfactant that is used to polymerize the monomers in the initial step of forming the emulsion. Water-external emulsion polymerizations typically employ a combination of non-ionic alkoxylated alcohol or fatty acid along with an anionic surfactant of higher HLB. The choice of surfactants affects the emulsion stability, viscosity, and ability to invert into a hydrocarbon stream. Anionic surfactants provide good emulsion stability but at the expense of poor inversion speed. Non-ionic surfactants with low cloud points are advantageous surfactants for polymerizing the monomers for emulsion DRA applications.

Further, the polymer compositions described herein can have the emulsifying surfactant comprise a $C_{10}$-$C_{20}$ alkyl ethoxy sulfate, an alkoxylated alkylphenol, an alkoxylated alcohol, an ethylene oxide/propylene oxide copolymer, a hydrolyzed polyvinylacetate, a dialkyl sulfosuccinate, or a combination thereof.

The polymer compositions can also include an emulsifying surfactant having a cloud point less than or equal to about 60° C., less than equal to about 50° C., less than equal to about 40° C., less than equal to about 35° C., less than equal to about 30° C., less than equal to about 25° C., less than equal to about 20° C., less than or equal to about 15° C., less than or equal to about 10° C., when the cloud point of the emulsifying surfactant is measured at a concentration of 1 wt. % in deionized water.

Further, the polymer compositions can include an emulsifying surfactant having a cloud point from about 0° C. to about 60° C., from about 0° C. to about 50° C., from about 0° C. to about 40° C., from about 0° C. to o about 35° C., from about 0° C. to about 30° C., from about 0° C. to about 25° C., from about 0° C. to about 20° C., from about 0° C. to about 15° C., from about 0° C. to about 10° C., when the cloud point of the emulsifying surfactant is measured at a concentration of 1 wt. % in deionized water.

Additionally, the polymer compositions described herein can have the emulsifying surfactant comprises a lauryl ethoxy sulfate, an ethoxylated octylphenol, an ethoxylated nonylphenol, an ethoxylated branched secondary alcohol, and ethoxylated alkyl alcohol, an ethoxylated/propoxylated alkylphenol, a di($C_4$-$C_{10}$ alkyl) sulfosuccinate, or a combination thereof.

The polymer compositions can include an emulsifying surfactant has a HLB of equal to or greater than 8, 10, 12, 14, 16, 18, 20, 22, 24, 26, 28, 30, 32, 34, 36, 38, 40, or more.

Furthermore, the polymer compositions of this disclosure have the emulsifying surfactant comprises a sodium lauryl ethoxy sulfate having an average of 2 to 6 ethylene oxide units per molecule, an ethoxylated octylphenol having an average of 5 to 10 ethylene oxide units per molecule, an ethoxylated nonylphenol having an average of 6 to 12 ethylene oxide units per molecule, an ethoxylated branched secondary alcohol having an average of 6 to 10 ethylene oxide units per molecule, and ethoxylated isodecyl alcohol having an average of 4 to 8 ethylene oxide units per molecule, a dioctyl sulfosuccinate, or a combination thereof.

The polymer compositions can have the emulsifying surfactant having a cloud point of equal to or less than 70° C., equal to or less than 60° C., equal to or less than 50° C., equal to or less than 40° C., equal to or less than 30° C., or equal to or less than 25° C. when the cloud point of the surfactant is measured at a concentration of 1 wt. % in deionized water.

The surfactants used to emulsify the monomers as an internal phase in water (or a water-ethylene glycol blend) can be a surfactant that provides a stable emulsion and minimizes coagulum formation. Advantageous surfactants have a low cloud point and a HLB that decreases rapidly with increasing temperature in order to facilitate inversion into a warm hydrocarbon stream. An ethoxylated octylphenol with 7.5 EO units sold under the Tradename of Triton X-114 is particularly useful. This surfactant has a cloud point of 25° C. and an HLB of 12.3.

Another important component of an effective DRA package is a dispersant that facilitates the dispersal of the water-external emulsion into the crude oil in tiny droplets. Dispersing the emulsion quickly and effectively to achieve high surface area droplets is key to quick inversion of the emulsion and release of the DRA polymer. Several dispersants have been found to provide superior inversion. One type of effective dispersant is a fatty acid condensate with an alkanolamine to form an amide or ester. Specifically, N,N-bis(2-hydroxyethyl)oleamide and similar fatty acid-derived amides are most preferred. Sodium bis(2-ethylhexyl)sulfosuccinate (DOSS) is another effective dispersant. A third useful dispersant is an alkoxylated polydimethylsiloxane with the Tradename of BYK 7105. If subject to an HLB calculation or experimental evaluation, these dispersants would typically fall into the 7 to 12 range as defined by Griffin and described in his 1949 and 1954 publications.

The polymer compositions described herein can have the emulsifying surfactant comprise from about 0.5 wt. % to about 16 wt. %, from about 0.5 wt. % to about 10 wt. %, from about 0.5 wt. % to about 8 wt. %, from about 0.5 wt. % to about 6 wt. %, from about 0.5 wt. % to about 4 wt. %, from about 0.5 wt. % to about 3 wt. %, from about 1 wt. % to about 16 wt. %, from about 1 wt. % to about 10 wt. %, from about 1 wt. % to about 8 wt. %, from about 1 wt. % to about 6 wt. %, from about 1 wt. % to about 4 wt. %, from about 1 wt. % to about 3 wt. %, from about 2 wt. % to about 16 wt. %, from about 2 wt. % to about 10 wt. %, from about 2 wt. % to about 8 wt. %, from about 2 wt. % to about 6 wt. %, from about 2 wt. % to about 4 wt. %, from about 2 wt. % to about 3 wt. %, or from about 1 wt. % to about 8 wt. % of the polymer composition, based on the amount of the oil-soluble polymer, emulsifying surfactant, and water.

The polymer compositions described herein can further comprise a dispersant.

Additionally, the polymer compositions can include a dispersant that is a condensation product of a fatty acid and an alkanolamine, an amine-terminated diglycol, an amine-terminated polyglycol, an alkyl sulfosuccinate, a bis(alkyl) sulfosuccinate, an alkoxylated polydimethylsiloxane, or a combination thereof. While oleic acid is the preferred fatty acid for the condensation reaction, fatty acids with carbon numbers between 12 and 22 and unsaturation values between 0 and 3 are acceptable alternate fatty acids.

The polymer compositions disclosed herein can have the dispersant comprises N-hydroxyethyl oleamide, N-(2-hydroxypropyl)oleamide, N-(3-hydroxypropyl)oleamide, N,N-bis(2-hydroxyethyl)oleamide, N,N-bis(2-hydroxypropyl)oleamide, N,N-bis(3-hydroxypropyl)oleamide, N-(2-(2-hydroxyethoxy)ethyl)oleamide, N,N-bis(2-(2-hydroxyethoxy)ethyl)oleamide, sodium bis(2-ethylhexyl) sulfosuccinate, alkoxylated polydimethylsiloxane, or a combination thereof; particularly, the alkanolamide dispersant comprises N,N-bis(2-hydroxyethyl)oleamide.

The polymer compositions can also have the concentration of the dispersant is from about 0.01 wt. % to about 10 wt. %, from about 0.01 wt. % to about 8 wt. %, from about 0.01 wt. % to about 6 wt. %, from about 0.01 wt. % to about 5 wt. %, from about 0.01 wt. % to about 4 wt. %, from about 0.01 wt. % to about 3 wt. %, from about 1 wt. % to about 10 wt. %, from about 1 wt. % to about 8 wt. %, from about 1 wt. % to about 6 wt. %, from about 1 wt. % to about 5 wt. %, from about 1 wt. % to about 4 wt. %, from about 1 wt. % to about 3 wt. %, or from about 0.1 wt. % to about 4 wt. % in the polymer composition, based on the amount of the oil-soluble polymer, emulsifying surfactant, water, and dispersant.

The polymer compositions can also further comprise a metal salt, an ammonium salt, or a combination thereof; particularly, the metal of the metal salt comprises sodium, potassium, calcium, magnesium, aluminum, or a combination thereof.

The polymer compositions described herein can have the concentration of the metal or ammonium salt is from about 0.001 wt. % to about 5 wt. % in the polymer composition, based on the amount of the oil-soluble polymer, emulsifying surfactant, water, and metal salt.

An advantageous metal salt is calcium chloride at a concentration of 0.1 wt % to 5 wt % and particularly, a concentration of 0.5% of $CaCl_2$.

Another component of an effective DRA package intended for subsea applications is a hydrate inhibitor to prevent the water in the external phase of the emulsion from forming conduit-blocking hydrates with methane that may ingress into the umbilical. Thermal hydrate inhibitors such as methanol and ethylene glycol are typical components of chemical packages delivered through umbilical tubes. For DRA applications, ethylene glycol is advantageous due to its better compatibility with the emulsion.

Also, the polymer compositions can further comprise an alcohol, a glycol, a polyglycol, or a combination thereof; particularly, the glycol is ethylene glycol. Additionally, the polymer compositions can comprise methanol.

Additionally, the polymer compositions disclosed herein can have the concentration of the alcohol, glycol, or polyglycol from about 1 wt. % to about 50 wt. % of the polymer composition, based on the amount of the oil-soluble polymer, emulsifying surfactant, water, and alcohol, glycol, or polyglycol.

Another important component of an effective DRA package is a lubricant; particularly a seal lubricant. It has been discovered that incorporating a separate liquid lubricant into the DRA facilitates pumping the emulsion with plunger pumps. The lubricant coats the seal and plunger and allows the plunger to slide through the elastomer seal with less friction. This is effective at reducing deposit formation, reducing seal erosion caused by the polymer plating out on the plunger surface, and facilitates the flow of the emulsion through the delivery system. Most preferred are low viscosity lubricants that are immiscible with the DRA polymer and immiscible with the external phase and reside at the periphery of the emulsion with its container or conduit. An advantageous lubricant material is low-viscosity polydimethylsiloxane. Similar materials including alkoxylated polydimethylsiloxane can also be used and can be used in combination with other lubricant materials.

The polymer compositions disclosed herein can further comprise a lubricant; particularly, the lubricant is a polydimethyl silicone agent.

The polymer compositions disclosed herein can have the concentration of the lubricant from about 0.01 wt. % to about 2 wt. %, from about 0.01 wt. % to about 1.5 wt. %, from about 0.01 wt. % to about 1 wt. %, from about 0.1 wt. % to about 2 wt. %, from about 0.1 wt. % to about 1.5 wt. %, from about 0.1 wt. % to about 1 wt. %, from about 0.2 wt. % to about 2 wt. %, from about 0.2 wt. % to about 1.5 wt. %, or from about 0.2 wt. % to about 1 wt. % of the polymer composition, based on the amount of the oil-soluble polymer, emulsifying surfactant, water, and lubricant.

Further, the polymer compositions can further comprise a pH neutralizer; particularly, the pH neutralizer comprises sodium hydroxide, potassium hydroxide, ammonium hydroxide, or a combination thereof.

The polymer compositions described herein can have the oil-in-water emulsion inverts to release the high molecular weight oil-soluble polymer into a hydrocarbon composition resulting in at least 5%, 10%, 15%, 20%, 25%, 30%, 35%, 40% or more drag reduction of the hydrocarbon composition within 15 minutes after contacting the oil-in-water emulsion with the hydrocarbon composition.

Also, the polymer compositions can have at least 60%, 70%, 80%, 90%, 95% by weight of the high molecular weight oil-soluble polymer is released into a hydrocarbon composition.

The polymer compositions described herein can have the high molecular weight oil-soluble polymer is released into the hydrocarbon composition within 50 minutes, within 40 minutes, within 30 minutes, within 20 minutes, within 10 minutes, or within 5 minutes after contacting the oil-in-water emulsion with the hydrocarbon composition.

The polymer compositions can have the hydrocarbon composition that the oil-soluble polymer is released into comprises at least about 20 wt. % of hydrocarbon based on the total weight of the hydrocarbon composition.

Further, the polymer compositions can have the hydrocarbon composition be recovered from a subterranean hydrocarbon-containing reservoir; particularly, the hydrocarbon composition recovered from the subterranean hydrocarbon-containing reservoir is a produced fluid comprising at least about 50 wt. % hydrocarbon.

A low bulk viscosity is critical to pumping a large volume of liquid through miles of narrow conduit at manageable pumping pressures. The addition of many of the additives described above into the base emulsion can raise the viscosity of the emulsion. If this occurs, it is useful to add a viscosity modifier to counter-act the viscosity increase and reduce the bulk viscosity back to a pumpable level. It has been found that the addition of a small amount of salt to the emulsion can reduce the viscosity significantly.

The polymer compositions can have the bulk viscosity of the polymer composition is less than about 5000 centipoise, less than about 500 centipoise, less than about 200 centipoise, less than about 100 centipoise, less than about 50 centipoise, at a temperature of 20° C.

The polymerization can be conducted under any effective conditions and techniques known in the art. Advantageously, the polymerization is conducted with redox initiators such as sodium bisulfite and tert-butyl hydroperoxide at a temperature below about 40° C.

Further, disclosed herein are methods of delivering the polymer compositions to a hydrocarbon composition recovered from a hydrocarbon-containing subterranean formation comprising transporting the polymer composition through a fluid conduit, wherein the viscosity of the polymer composition is less than 500 centipoise in the fluid conduit and the oil-soluble polymer begins being released from the emulsion within 30 minutes of contacting the hydrocarbon composition.

In the methods of delivering polymer compositions described herein can have the fluid conduit has a length of at least about 100 feet, at least about 200 feet, at least about 300 feet, at least about 400 feet, or at least about 500 feet.

In the methods for delivering the polymer compositions, the viscosity of the polymer composition is less than 200 centipoise measured at 20° C. in the fluid conduit and the oil-soluble polymer begins being released from the emulsion within 5 minutes of contacting the hydrocarbon composition.

Also disclosed herein are methods of reducing the drag associated with transporting a hydrocarbon fluid through a subsea flowline comprising transporting the polymer compositions through an umbilical line to the subsea flowline and contacting the polymer composition with the hydrocarbon fluid at an injection point.

The polymer compositions can be used in a method to inhibit corrosion, inhibit scale deposition, inhibit asphaltene deposition, inhibit paraffin deposition, inhibit hydrate formation, improve flow of the fluid, break an emulsion, stabilize a clay, inhibit bacteria growth, provide a salt, modify permeability of a subterranean reservoir, scavenge sulfide, intensify inhibition of corrosion, control pH, act as a surfactant, control fluid loss, provide chelation, act as a foamer, act as a defoamer, provide emulsion stability, control iron, provide solvation, reduce friction, or a combination thereof.

The polymer compositions can have additional components to achieve an effect for the methods and uses described above can Additionally, the copolymers of hydrophobic monomers and one or more charged monomers substantially reduces/inhibits corrosion of a metal surface. Under the conditions and concentrations assessed, the disclosed copolymers were found to be more effective than some typically used corrosion inhibitor chemistries for mitigating steel corrosion. Further, for reducing pump deposits, emulsion polymers prepared from a majority of non-ionic alkyl acrylate and methacrylate monomer units and a minority of ionic monomer units, are effective.

A further benefit of the water-external emulsion polymers is a corrosion inhibitor to mitigate corrosion or steel structures when in contact with water. Oftentimes oil soluble chemistries are seen to provide good corrosion inhibition when in contact with steel surfaces but in pipelines operating under low flowing conditions in which there are separate oil and water phases such chemistries tend to reside in the oil phase with little partitioning to the water phase and in turn make little contact with steel surfaces. Having polymers within a water-external emulsion may assist the transport through an oil phase to deliver the chemistry to the water and in turn increase its contact with the steel surface and increase corrosion inhibition.

Additionally, methods of inhibiting corrosion at a surface can comprise contacting the surface with an effective amount of the polymer compositions described herein or adding the polymer compositions to a fluid which contact the surface to inhibit corrosion on the surface.

In the methods of inhibiting corrosion, the surface is a metal surface.

In the methods of inhibiting corrosion, the surface is part of a wellbore or equipment used in the production, transportation, storage, and/or separation of the fluid; particularly, the surface is part of equipment used in a coal-fired process, a waste-water process, a farm, a slaughter house, a land-fill, a municipality waste-water plant, a coking coal process, or a biofuel process.

Additionally, in the methods of inhibiting corrosion, the equipment comprises a pipeline, a storage vessel, downhole injection tubing, a flow line, or an injection line and the fluid comprises natural gas or a liquid hydrocarbon; particularly, the liquid hydrocarbon comprises crude oil, heavy oil, processed residual oil, bituminous oil, cocker oil, gas oil, fluid catalytic cracker feed or slurry, naphtha, diesel fuel, fuel oil, jet fuel, gasoline, or kerosene.

Also disclosed are methods of reducing the drag associated with transporting a hydrocarbon fluid through a subsea flowline comprising transporting the polymer compositions through an umbilical line to the subsea flowline and contacting the polymer composition with the hydrocarbon fluid at an injection point.

The amount of the oil-soluble polymer injected into the subsea flowline comprises from about 10 ppm to about 10,000 ppm, from about 10 ppm to about 5,000 ppm, from about 10 ppm to about 1,000 ppm, from about 10 ppm to about 750 ppm, from about 10 ppm to about 500 ppm, from about 25 ppm to about 10,000 ppm, from about 25 ppm to about 5,000 ppm, from about 25 ppm to about 1,000 ppm, from about 25 ppm to about 750 ppm, from about 25 ppm to about 500 ppm, from about 50 ppm to about 10,000 ppm, from about 50 ppm to about 5,000 ppm, from about 50 ppm to about 1,000 ppm, from about 50 ppm to about 750 ppm, or from about 50 ppm to about 500 ppm. Preferably, the amount of the oil-soluble polymer injected into the subsea flowline comprises from about 50 ppm to about 500 ppm based on the total amount of the produced fluid in the flowline.

The polymer compositions can be injected into an umbilical line that is part of an offshore production system. The offshore production system can include a plurality of subsea wellheads, a common production manifold, an offshore platform, a subsea flowline, and an umbilical line. Each wellhead can operate to produce a hydrocarbon-containing fluid from a subterranean hydrocarbon-containing formation. Each wellhead is also connected to the production manifold so that the produced hydrocarbon-containing fluid can flow and be combined with the produced hydrocarbons from other wellheads. The combined produced hydrocarbons can flow from the production manifold to the offshore platform through the subsea flowline. The umbilical line can be connected to a control device on the offshore platform and to either the wellheads, the production manifold, or the subsea flowline.

The length of the umbilical line is typically at least about 100 feet, 200 feet, 300 feet, 400 feet, 500 feet, more typically, at least about 1000 feet, or more.

The polymer compositions have physical properties that allow pumping through an umbilical line long distances at typical operating conditions of from 40° C. to 2° C. and a pressure from atmospheric pressure to 15,000 pounds per square inch (psi).

For the polymer to function as a drag reducer, the high molecular weight oil-soluble polymer is dissolved or substantially (at least 50 wt. % of the polymer) solvated in the produced hydrocarbon fluid.

Also disclosed is a process of reducing frictional pressure loss in hydrocarbon fluids flowing through a conduit comprising adding to said hydrocarbon fluid an aqueous polymer emulsion containing a plurality of high molecular weight polymer particles and comprising (a) from 5 to 50% by weight of a polymer derived from a majority of hydrophobic monomer and a minority of ionizable monomers polymerized together in a single step and (b) from 10 to 50 percent by weight of glycol and (c) from 10 to 50 percent by weight of water and (d) from 1 to 10 percent total by weight of surfactant and dispersant. The emulsion polymer particles possess a zeta potential less than negative ten or greater than positive ten and the polymer emulsion is added in an amount such that the resulting hydrocarbon fluid contains from about 20 ppm to 1000 ppm of active polymer based upon the total weight of the hydrocarbon fluid.

The process described above wherein conveying the emulsion polymer through a pump results in less than 50 percent of the weight of deposits as would be formed by the emulsion when the polymer consists only of the hydrophobic monomer.

The process described above wherein the ionizable monomers are present in the polymer from 0.1 to 10 weight percent of the total polymer mass with the balance being derived from the hydrophobic monomer.

The process described above wherein the hydrophobic monomer is an alkyl acrylate or alkyl methacrylate with an alkyl length of 8 to 18 carbon atoms The process described above wherein the hydrophobic monomer is 2-ethylhexyl methacrylate.

The process described above wherein the ionizable monomers are selected from dimethylaminoethyl acrylate, dimethylaminoethyl methacrylate, dimethylaminopropyl methacrylamide, 4-vinyl benzenesulfonic acid, and 2-methyl-2-(prop-2-enamido)propane-1-sulfonic acid.

The process described above wherein the glycol is ethylene glycol.

The process described above wherein the surfactant, in part or in total, has a cloud point below 40° C.

The process described herein wherein the surfactant, in part or in total, is ethoxylated 4-octylphenol with about 7.5 ethylene oxide units.

The process described herein wherein the dispersant is selected from N,N-bis(2-hydroxyethyl) oleamide, sodium bis(2-ethylhexyl) sulfosuccinate, and/or alkoxylated polydimethylsiloxane.

The process described herein wherein the polymeric emulsion contains a lubricity agent.

The process described herein wherein the lubricity agent is polydimethylsiloxane and/or alkoxylated polydimethylsiloxane with a viscosity of about 5 to about 5,000 cSt.

The process described herein wherein the polymeric emulsion contains a viscosity modifier.

The process described herein wherein the viscosity modifier is a salt with ions selected from sodium, potassium, calcium, magnesium, ammonium, chloride, bromide, sulfate, nitrate, phosphate, and carbonate.

The process described herein wherein the viscosity modifier is calcium chloride with a concentration of about 0.1 to about 5 percent by weight of the emulsion.

The process described herein wherein the emulsion inverts in odorless kerosene and reaches a minimum friction reduction of about 20% within 15 minutes of addition at a kerosene temperature of 50° C. or greater.

The process described above wherein the emulsion inverts in crude oil that contains a water cut of about 5 to about 60% and achieves a greater friction reduction than in the same crude oil containing a water cut of 0 to about 5%.

The process described herein wherein the emulsion inverts in crude oil with an API gravity of about 26 or less and reaches a minimum friction reduction of about 20% within about 15 minutes of addition at an oil temperature of about 30° C. or lower.

The process described herein wherein the emulsion polymer is present as particles with a diameter of 10 to 1000 nanometers.

The disclosure is also directed to the following embodiments.

Embodiment 1

A polymer composition comprising an oil-in-water emulsion comprising an aqueous phase comprising water and an emulsifying surfactant having a cloud point of less than 80° C. and a hydrophilic-lipophilic balance (HLB) of greater than or equal to 8, and an oil phase comprising a high molecular weight oil-soluble polymer, wherein the oil-soluble polymer comprises a copolymer derived from reaction of a hydrophobic monomer and an ionizable monomer in a weight ratio from about 999:1 to about 80:20.

Embodiment 2

The polymer composition of embodiment 1, wherein the oil-soluble polymer comprises a copolymer derived from reaction of a hydrophobic monomer and an ionizable monomer in a weight ratio from about 999:1 to about 99:1; from about 99:1 to about 80:20; from about 90:10 to about 80:20; from about 99:1 to about 85:15; from about 90:10 to about 85:15; or from about 99:1 to about 90:10.

Embodiment 3

The polymer composition of Embodiments 1 or 2, wherein the molecular weight of the oil-soluble polymer is greater than about 1,000,000 Daltons as measured by gel permeation chromatograph (GPC) as compared to a polystyrene standard.

Embodiment 4

The polymer composition of Embodiment 3, wherein the molecular weight of the oil-soluble polymer is from about 5,000,000 Daltons to about 50,000,000 Daltons.

Embodiment 5

The polymer composition of any one of Embodiments 1 to 4, wherein the ionizable monomer comprises a styrene sulfonate, styrene sulfonic acid, a vinyl sulfonate, a vinyl sulfonic acid, an acrylamide alkyl sulfonic acid, an acrylamide alkyl sulfonate, a methacrylamide alkyl sulfonic acid, a methacrylamide alkyl sulfonate, a dialkylaminoalkyl methacrylate, a dialkylaminoalkyl acrylate, a dialkylaminoalkyl methacrylamide, a dialkylaminoalkyl acrylamine, or a combination thereof.

Embodiment 6

The polymer composition of Embodiment 5, wherein the ionizable monomer comprises a styrene sulfonate, a vinyl sulfonate, an acrylamide alkyl sulfonic acid, an acrylamide alkyl sulfonate, a methacrylamide alkyl sulfonic acid, a methacrylamide alkyl sulfonate, or a combination thereof.

Embodiment 7

The polymer composition of Embodiment 5, wherein the ionizable monomer comprises a dialkylaminoalkyl methacrylate, a dialkylaminoalkyl acrylate, a dialkylaminoalkyl methacrylamide, a dialkylaminoalkyl acrylamine, or a combination thereof.

Embodiment 8

The polymer composition of any one of Embodiments 1 to 5, wherein the ionizable monomer comprises styrene sulfonate, styrene sulfonic acid, acrylamide tert-butyl sulfonic acid (ATBS), acrylamide tert-butyl sulfonate, methacrylamide tert-butyl sulfonic acid, methacrylamide tert-butyl sulfonate, dimethylaminoethyl methacrylate, dimethylaminoethyl acrylate, dimethylaminoethyl methacrylamide, dimethylaminoethyl acrylamine, or a combination thereof.

Embodiment 9

The polymer composition of any one of Embodiments 1 to 8, wherein the hydrophobic monomer comprises propyl acrylate, propyl methacrylate, butyl acrylate, butyl methacrylate, iso-butyl acrylate, iso-butyl methacrylate, tert-butyl acrylate, tert-butyl methacrylate, pentyl acrylate, pentyl methacrylate, isopentyl acrylate, isopentyl methacrylate, hexyl acrylate, hexyl methacrylate, cyclohexyl acrylate, cyclohexyl methacrylate, heptyl acrylate, heptyl methacrylate, octyl acrylate, octyl methacrylate, iso-octyl acrylate, iso-octyl methacrylate, iso-decyl acrylate, iso-decyl methacrylate, lauryl acrylate, lauryl methacrylate, stearyl acrylate, stearyl methacrylate, behenyl acrylate, behenyl methacrylate, 2-ethylhexyl acrylate, 2-ethylhexyl methacrylate, 2-propylheptyl acrylate, 2-propylheptyl methacrylate, benzyl acrylate, benzyl methacrylate, 2-phenylethyl acrylate, 2-phenylethyl methacrylate, tridecyl acrylate, tridecyl methacrylate, iso-bornyl acrylate, iso-bornyl methacrylate, 3,5,5-trimethylhexyl acrylate, 3,5,5-trimethylhexyl methacrylate, 3,3,5-trimethylcyclohexyl acrylate, 3,3,5-trimethylcyclohexyl methacrylate, 2-hydroxyethyl acrylate, 2-hydroxyethyl methacrylate, 2-hydroxypropyl acrylate, 2-hydroxypropyl methacrylate, 2-hydroxybutyl acrylate, 2-hydroxybutyl methacrylate, 2-hydroxyethylcaprolactone acrylate, 2-hydroxyethylcaprolactone methacrylate, dihydrodicyclopentadienyl acrylate, dihydrodicyclopentadienyl methacrylate, ethyldiglycol acrylate, ethyldiglycol methacrylate, C17 acrylate, C17 methacrylate, vinylbenzylpolyoxyethylene alkyl ether, polyoxyethylene alkyl acrylate, polyoxyethylene alkyl methacrylate, styrene, or a combination or isomeric form thereof.

Embodiment 10

The polymer composition of Embodiment 9, wherein the hydrophobic monomer comprises 2-ethylhexyl methacrylate, 2-ethylhexyl acrylate, styrene, or a combination thereof.

Embodiment 11

The polymer composition of any one of Embodiments 1 to 10, wherein the emulsifying surfactant comprises a C10-C20 alkyl ethoxy sulfate, an alkoxylated alkylphenol, an alkoxylated alcohol, an ethylene oxide/propylene oxide copolymer, hydrolyzed polyvinylacetates or a combination thereof.

Embodiment 12

The polymer composition of Embodiment 11, wherein the emulsifying surfactant has a cloud point at least 10° C., at least 20° C., at least 30° C., at least 40° C., at least 50° C., or more less than the temperature of the hydrocarbon composition when the cloud point of the emulsifying surfactant is measured at a concentration of 1 wt. % in deionized water. Additionally, the cloud point can be less than or equal to 60° C., less than equal to 50° C., less than equal to 40° C., less than equal to 35° C., less than equal to 30° C., less than equal to 25° C., less than equal to 20° C., less than or equal to 15° C., less than or equal to 10° C., when the cloud point of the emulsifying surfactant is measured at a concentration of 1 wt. % in deionized water.

Embodiment 13

The polymer composition of Embodiment 11 or 12, wherein the emulsifying surfactant comprises a lauryl ethoxy sulfate, an ethoxylated octylphenol, an ethoxylated nonylphenol, an ethoxylated branched secondary alcohol, and ethoxylated alkyl alcohol, an ethoxylated/propoxylated alkylphenol, or a combination thereof.

Embodiment 14

The polymer composition of any one of Embodiments 1 to 13, wherein the emulsifying surfactant has a HLB of equal to or greater than 8, 10, 12, 14, 16, 18, 20, 22, 24, 26, 28, 30, 32, 34, 36, 38, 40, or more.

Embodiment 15

The polymer composition of any one of Embodiments 11 to 14, wherein the emulsifying surfactant comprises a sodium lauryl ethoxy sulfate having an average of 2 to 6 ethylene oxide units per molecule, an ethoxylated octylphenol having an average of 5 to 10 ethylene oxide units per molecule, an ethoxylated nonylphenol having an average of 6 to 12 ethylene oxide units per molecule, an ethoxylated branched secondary alcohol having an average of 6 to 10 ethylene oxide units per molecule, and ethoxylated isodecyl alcohol having an average of 4 to 8 ethylene oxide units per molecule, a dioctyl sulfosuccinate, or a combination thereof.

Embodiment 16

The polymer composition of any one of Embodiments 1 to 15, wherein the emulsifying surfactant has a cloud point of equal to or less than 70° C., equal to or less than 60° C., equal to or less than 50° C., equal to or less than 40° C., equal to or less than 30° C., or equal to or less than 25° C. when the cloud point of the surfactant is measured at a concentration of 1 wt. % in deionized water.

Embodiment 17

The polymer composition of any one of Embodiments 1 to 16, further comprising a dispersant.

Embodiment 18

The polymer composition of Embodiment 17, wherein the dispersant is a condensation product of a fatty acid and an alkanolamine, an amine-terminated diglycol, an amine-terminated polyglycol, an alkyl sulfosuccinate, a bis(alkyl) sulfosuccinate, an alkoxylated polydimethylsiloxane, or a combination thereof.

Embodiment 19

The polymer composition of Embodiment 17 or 18, wherein the dispersant comprises N-hydroxyethyl oleamide, N-(2-hydroxypropyl)oleamide, N-(3-hydroxypropyl)oleamide, N,N-bis(2-hydroxyethyl)oleamide, N,N-bis(2-hydroxypropyl)oleamide, N,N-bis(3-hydroxypropyl)oleamide, N-(2-(2-hydroxyethoxy)ethyl)oleamide, N,N-bis(2-(2-hydroxyethoxy)ethyl)oleamide, disodium lauryl sulfosuccinate, sodium dihexyl sulfosuccinate, sodium bis(2-ethylhexyl)sulfosuccinate, alkoxylated polydimethylsiloxane, or a combination thereof.

Embodiment 20

The polymer composition of Embodiment 19, wherein the alkanolamide dispersant comprises N,N-bis(2-hydroxyethyl)oleamide.

Embodiment 21

The polymer composition of any one of Embodiments 1 to 20, further comprising a metal salt, an ammonium salt, or a combination thereof.

Embodiment 22

The polymer composition of Embodiment 21, wherein the metal of the metal salt comprises sodium, potassium, calcium, magnesium, aluminum, or a combination thereof.

Embodiment 23

The polymer composition of any one of Embodiments 1 to 22, further comprising an alcohol, a glycol, a polyglycol, or a combination thereof.

Embodiment 24

The polymer composition of Embodiment 23, wherein the glycol is ethylene glycol.

Embodiment 25

The polymer composition of any one of Embodiments 1 to 24, further comprising a lubricant.

Embodiment 26

The polymer composition of Embodiment 25, wherein the lubricant is a polydimethyl silicone agent.

Embodiment 27

The polymer composition of any one of Embodiments 1 to 26, further comprising a pH neutralizer.

Embodiment 28

The polymer composition of Embodiment 27, wherein the pH neutralizer comprises sodium hydroxide, potassium hydroxide, ammonium hydroxide, or a combination thereof.

Embodiment 29

The polymer composition of any one of Embodiments 1 to 28, wherein the oil-soluble polymer has a concentration of from about 2 wt. % to about 75 wt. % in the polymer composition, based on the amount of the oil-soluble polymer, emulsifying surfactant, and water.

Embodiment 30

The polymer composition of Embodiment 29, wherein the oil-soluble polymer has a concentration of from about 20 wt. % to about 50 wt. % in the polymer composition.

Embodiment 31

The polymer composition of any one of Embodiments 1 to 30, wherein the concentration of the emulsifying surfactant comprises from about 0.5 wt. % to about 16 wt. % of the polymer composition, based on the amount of the oil-soluble polymer, emulsifying surfactant, and water.

Embodiment 32

The polymer composition of Embodiment 31, wherein the concentration of the emulsifying surfactant comprises from about 1 wt. % to about 8 wt. % of the polymer composition.

Embodiment 33

The polymer composition of any one of Embodiments 17 to 20, wherein the concentration of the dispersant is from about 0.01 wt. % to about 10 wt. % in the polymer composition, based on the amount of the oil-soluble polymer, emulsifying surfactant, water, and dispersant.

Embodiment 34

The polymer composition of Embodiment 33, wherein the concentration of the dispersant is from about 0.1 wt. % to about 4 wt. %.

Embodiment 35

The polymer composition of Embodiment 21 or 22, wherein the concentration of the metal salt is from about 0.001 wt. % to about 5 wt. % in the polymer composition, based on the amount of the oil-soluble polymer, emulsifying surfactant, water, and metal salt.

Embodiment 36

The polymer composition of Embodiment 23 or 24, wherein the concentration of the alcohol, glycol, or polyglycol is from about 1 wt. % to about 50 wt. % of the polymer composition, based on the amount of the oil-soluble polymer, emulsifying surfactant, water, and alcohol, glycol, or polyglycol.

Embodiment 37

The polymer composition of Embodiment 25 or 26, wherein the concentration of the lubricant is about 0.01 wt. % to about 2 wt. % of the polymer composition, based on the amount of the oil-soluble polymer, emulsifying surfactant, water, and lubricant.

Embodiment 38

The polymer composition of any one of Embodiments 1 to 37, wherein the oil-in-water emulsion inverts to release the high molecular weight oil-soluble polymer into a hydrocarbon composition resulting in at least 5%, 10%, 15%, 20%, 25%, 30%, 35%, 40% or more drag reduction of the hydrocarbon composition within 15 minutes after contacting the oil-in-water emulsion with the hydrocarbon composition.

Embodiment 39

The polymer composition of Embodiment 38, wherein the hydrocarbon composition that the oil-soluble polymer is released into comprises at least about 20 wt. % of hydrocarbon based on the total weight of the hydrocarbon composition.

Embodiment 40

The polymer composition of Embodiment 38 or 39, wherein the hydrocarbon composition is recovered from a subterranean hydrocarbon-containing reservoir.

Embodiment 41

The polymer composition of Embodiment 40, wherein the hydrocarbon composition recovered from the subterranean hydrocarbon-containing reservoir is a produced fluid comprising at least about 50 wt. % hydrocarbon.

Embodiment 42

The polymer composition of any one of Embodiments 1 to 41, wherein the bulk viscosity of the polymer composition is less than about 5000 centipoise, less than about 500 centipoise, less than about 200 centipoise, less than about 100 centipoise, less than about 50 centipoise, at a temperature of 20° C.

Embodiment 43

A method of delivering the polymer composition of any one of Embodiments 1 to 42 to a hydrocarbon composition recovered from a hydrocarbon-containing subterranean formation comprising transporting the polymer composition through a fluid conduit, wherein the viscosity of the polymer composition is less than 500 centipoise in the fluid conduit and the oil-soluble polymer begins being released from the emulsion within 30 minutes of contacting the hydrocarbon composition.

Embodiment 44

The method of Embodiment 43, wherein the fluid conduit has a length of at least about 100 feet.

Embodiment 45

The method of Embodiment 43 or 44, wherein the viscosity of the polymer composition is less than 200 centipoise measured at 20 oC in the fluid conduit and the oil-soluble polymer begins being released from the emulsion within 5 minutes of contacting the hydrocarbon composition.

Embodiment 46

A method of reducing the drag associated with transporting a hydrocarbon fluid through a subsea flowline comprising transporting the polymer composition of any one of Embodiments 1 to 42 through an umbilical line to the subsea flowline and contacting the polymer composition with the hydrocarbon fluid at an injection point.

Embodiment 47

A method of inhibiting corrosion at a surface, the method comprising contacting the surface with an effective amount of the polymer composition of any one of Embodiments 1 to 42 or adding the polymer composition to a fluid which contact the surface to inhibit corrosion on the surface.

Embodiment 48

The method of Embodiment 47, wherein the surface is a metal surface.

Embodiment 49

The method of Embodiment 47 or 48, wherein the surface is part of a wellbore or equipment used in the production, transportation, storage, and/or separation of the fluid.

Embodiment 50

The method of any one of Embodiments 47 to 49, wherein the surface is part of equipment used in a coal-fired process, a waste-water process, a farm, a slaughter house, a land-fill, a municipality waste-water plant, a coking coal process, or a biofuel process.

Embodiment 51

The method of any one of Embodiments 47 to 49, wherein the equipment comprises a pipeline, a storage vessel, downhole injection tubing, a flow line, or an injection line.

Embodiment 52

The method of any one of Embodiments 47 to 51, wherein the fluid comprises natural gas or a liquid hydrocarbon.

Embodiment 53

The method of Embodiment 52, wherein the liquid hydrocarbon comprises crude oil, heavy oil, processed residual oil, bituminous oil, cocker oil, gas oil, fluid catalytic cracker feed or slurry, naphtha, diesel fuel, fuel oil, jet fuel, gasoline, or kerosene.

Embodiment 54

A method or use of the polymer composition of any one of Embodiments 1 to 42, for inhibiting corrosion, inhibiting scale deposition, inhibiting asphaltene deposition, inhibiting paraffin deposition, inhibiting hydrate formation, improving flow of the fluid, breaking an emulsion, improving flow of the fluid, stabilizing a clay, inhibiting bacteria growth, providing a salt, modifying permeability of a subterranean reservoir, scavenging sulfide, intensifying inhibition of corrosion, controlling pH, acting as a surfactant, controlling fluid loss, providing chelation, foaming, defoaming, providing emulsion stability, controlling iron, providing solvation, reducing friction, or a combination thereof.

Having described the invention in detail, it will be apparent that modifications and variations are possible without departing from the scope of the invention defined in the appended claims.

EXAMPLES

The following non-limiting examples are provided to further illustrate the present invention.

Comparative Example 1

Synthesis of Homopolymer—Comp-U

Into a 1.5 L, 5-neck resin kettle reactor was charged 2-ethylhexyl methacrylate (380 g), Triton X-114 ethoxylated octylphenol surfactant (40 g), DI water (574.6 g), Dow Antifoam A (0.25 g), disodium EDTA metal chelator (0.1 g), and Trigonox A-W70 tert-butylhydroperoxide (0.05 g). The reactor was stirred at 400 rpm and nitrogen-purged at 1-Liter per minute via a dip-tube for 15 minutes while the temperature was stabilized at 23° C. Then, a slow addition of 1% aqueous sodium bisulfite (SBS, 5 mL) was started via a syringe pump. After initiation, the nitrogen purge was slowed and shifted to the headspace. The SBS addition rate was adjusted to extend the polymerization over about two hours. The temperature was allowed to exotherm to a peak of 35° C. before cooling was applied. When the polymerization rate began to drop quickly, the SBS addition rate was set to add the remaining solution over one hour. The emulsion polymer was then filtered through a 150-micron screen into a storage container. The screen contained less than 5% coverage of small coagulum particles.

Example 2

Synthesis of AMPS Acid Copolymer—Comp-A

Into a 100-gallon stainless steel reactor with jacket cooling was charged DI Water (287.6 lb.), ATBS acid monomer (9.6 lb.), Dow Antifoam A (0.14 lb.), disodium EDTA metal chelator (0.13 lb.), and 2-ethylhexyl methacrylate (182.4 lb.). The reactor was stirred at 143 rpm and nitrogen-purged at 1 scfm via a dip-tube. After 30 minutes of mixing, Triton X-114 ethoxylated octylphenol surfactant (20.2 lb.) was added to the reactor along with Trigonox A-W70 tert-butylhydroperoxide (0.03 lb.) and the temperature was stabilized at 26° C. Then, a slow addition of 0.5% aqueous sodium bisulfite (5.1 lb.) was started via an ISCO pump at an initial rate of 0.45 mL/minute. After initiation, the nitrogen purge was slowed and shifted to the headspace. The SBS addition rate was adjusted to extend the polymerization over about two hours. The temperature was allowed to exotherm to a peak of 32° C. before cooling was applied. When the polymerization rate began to drop quickly, the SBS addition rate was set to add the remaining solution over 1 hour.

Example 3

Blend of AMPS Acid Copolymer—Comp-ASC

The reactor and emulsion polymer (505 lb.) of Example 2 was stabilized at 27° C. and stirred at 143 rpm. To the reactor was then added Dow Antifoam A (2.09 lb.). Next, a separate blend of ethylene glycol (289 lb.), N,N-Bis-(2-hydroxyethyl)oleamide (20.0 lb.), and aqueous 50% sodium hydroxide (3.67 lb.) was added to the reactor over one hour. Then, aqueous 31% calcium chloride (14.5 lb.) was added to the reactor. After an additional 30 minutes of mixing, the emulsion polymer blend was filtered through a 10-micron bag filter into a storage container. Filtration of 200 ml of emulsion through a 100-Mesh screen showed 5% coverage by small coagulum particles. The final bulk viscosity was 35.4 cP at 25° C.

Example 4

Synthesis of NaSS Copolymer. Comp-N

Into a 300-gallon stainless steel reactor with internal cooling coils was charged DI Water (835 lb.), Dow Antifoam A (0.55 lb.), sodium styrene sulfonate (NaSS) (2.28 lb.), disodium EDTA metal chelator (0.48 lb.), ethylene glycol (206.5 lb.), and 2-ethylhexyl methacrylate (760 lb.). The reactor was stirred at 102 rpm and nitrogen-purged at 2 scfm via a dip-tube. After 30 minutes of mixing, Triton X-114 ethoxylated octylphenol surfactant (76 lb.) was added to the reactor along with Trigonox A-W70 tert-butylhydroperoxide (0.095 lb.) and the temperature was stabilized at 26° C. Then, a slow addition of 0.5% aqueous sodium bisulfite (19 lb.) was started via an ISCO pump at an initial rate of 1.3 mL/minute. After initiation, the nitrogen purge was slowed and shifted to the headspace. The SBS addition rate was adjusted to extend the polymerization over about three hours. The temperature was allowed to exotherm to a peak of 35° C. before cooling was applied. When the polymerization rate began to drop quickly, the SBS addition rate was set to add the remaining solution over 1 hour.

Example 5

Blend of NaSS Copolymer. Comp-N222

The emulsion polymer (750 g) of Example 5 was stirred in a 2-Liter beaker at 800 rpm with an HS-1 Jiffy Mixer stir paddle. To the beaker was then added Dow Antifoam A (2.5 g). Next, a separate blend of ethylene glycol (187.5 g), Aerosol OT-70 PG (20 g), N,N-Bis-(2-hydroxyethyl)oleamide (20 g), and ammonium acetate (20 g), was added to the beaker over ten minutes. After an additional 30 minutes of mixing, the emulsion polymer blend was filtered through a 100-Mesh screen into a storage container. The screen showed less than 20% coverage by small coagulum particles.

Example 6

Synthesis of DMAEM-NaSS Terpolymer. Comp-DN

Into a 10-gallon stainless steel reactor with jacket cooling was charged DI Water (48.11 lb.), Dow Antifoam A (0.02 lb.), sodium styrene sulfonate (NaSS) (0.092 lb.), disodium EDTA metal chelator (0.020 lb.), N,N-dimethylaminoethyl methacrylate (DMAEMA) (1.526 lb.), valeric acid (1.088 lb.), and 2-ethylhexyl methacrylate (28.925 lb.). The reactor was stirred at 143 rpm and nitrogen-purged at 1 scfm via a dip-tube. After 30 minutes of mixing, Triton X-114 ethoxylated octylphenol surfactant (2.812 lb.) was added to the reactor along with Trigonox A-W70 tert-butylhydroperoxide (0.003 lb.) and the temperature was stabilized at 27° C. Then, a slow addition of 0.44% aqueous sodium bisulfite (0.68 lb.) was started via an ISCO pump at an initial rate of 0.04 mL/minute. After initiation, the nitrogen purge was slowed and shifted to the headspace. The SBS addition rate was adjusted to extend the polymerization over about three hours. The temperature was allowed to exotherm to a peak of 33° C. before cooling was applied. When the polymerization rate began to drop quickly, the SBS addition rate was set to add the remaining solution over 1 hour.

Example 7

Pump Test Results (Deposits) for Examples 1, 4, 6 and Compositions Specified in Table 1

Figure 2:
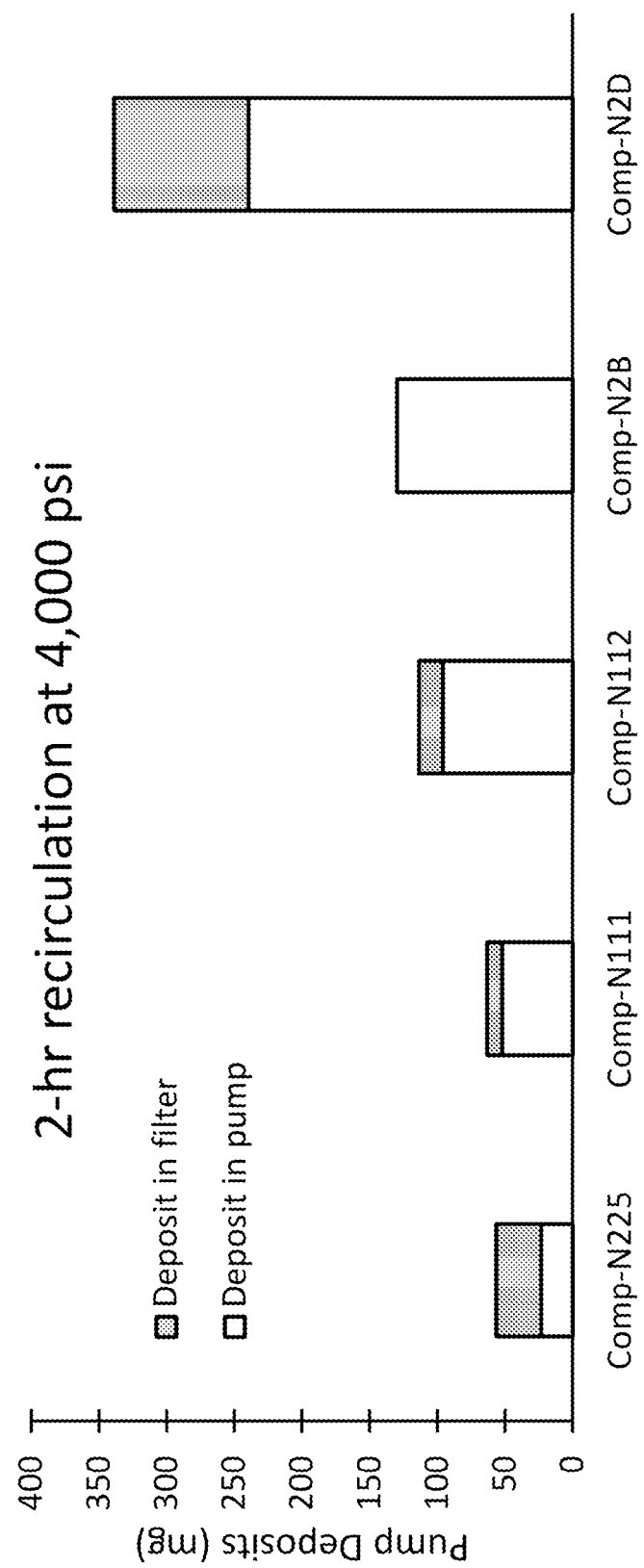
FIG. 2 shows a graph of deposits collected in a 2 hour recirculation pump test at 4,000 psi using a 500 g sample.

FIGS. 1 and 2 show deposits in mg for a 2 hour recirculation pump test.

TABLE 1

Composition of additives blended with Comp-N. Each composition contained 75 wt. % of Comp-N, 0.25% wt. of Dow Antifoam A, 20% wt. of Ethylene glycol and deionized water

| | Additives (% wt.) | | | |
|---|---|---|---|---|
| Composition | N,N-bis(2-hydroxy-ethyl)oleamide | Sodium bis(2-ethyl-hexyl)sulfo-succinate | Ammonium Acetate | BYK 7105 |
| Comp-N225 | 2 | 2 | 0.5 | 0 |
| Comp-N111 | 1 | 1 | 1 | 0 |
| Comp-N112 | 1 | 1 | 2 | 0 |
| Comp-N2B | 0 | 0 | 0 | 2 |
| Comp-N2D | 0 | 2 | 0 | 0 |

Example 8

Flow Loop Results for Examples 1, 3, 5

Figure 3:
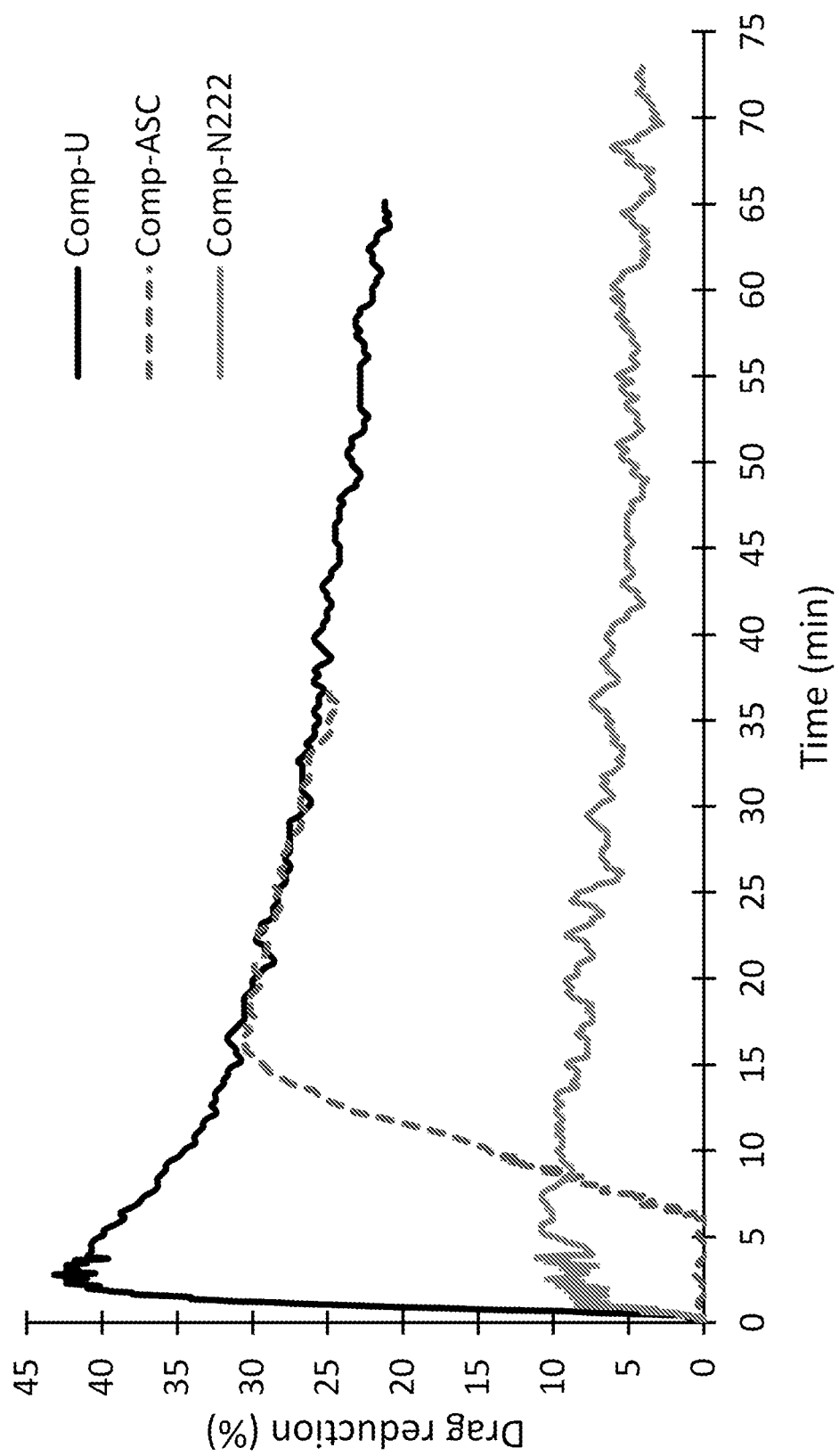
FIG. 3 show a graph of the percentage drag reduction versus time (minutes) in a flow loop system using particular agents at a concentration of 60 ppm in kerosene at 60° C. after neat injection into the flow loop system.

Flow loop results for Comp-U, Comp-ASC, and Comp-N222 using the method described below are shown in FIG. 3.

Example 9

Torque Monitor Results for Crude Oils a, B, C and M for Compositions Comp-N111 and Comp-N112

Figure 4:
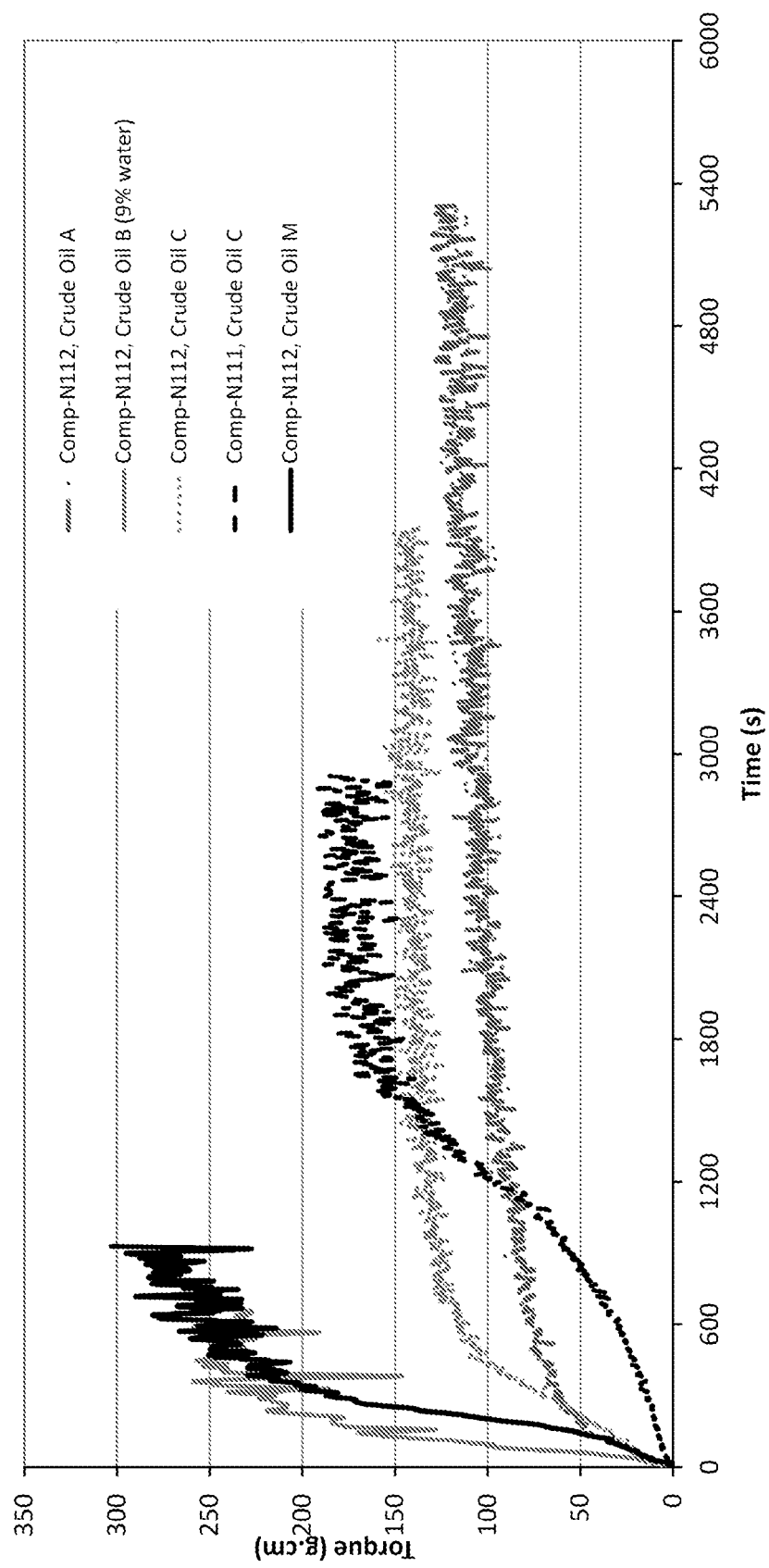
FIG. 4 shows a graph of the torque in g·cm versus time (seconds) for copolymer blends with different crude oils using 3 g of copolymer added to 375 g of crude oil at 60° C.

Torque monitor results using the method described below are shown in FIG. 4.

Example 10

Corrosion Protection Test Results for Examples 1, 2, 4

Bubble cell test results using the method described below are presented in Table 2.

TABLE 2

Bubble test results showing the high molecular weight polymer emulsion chemistries enhanced corrosion protection performance compared with the commonly used quaternary ammonium chloride active.

| Test Chemistry | 2-Mercapto-ethanol Activity (%) | Test Chemistry Activity (%) | Dosage (ppm) | 2-Mercapto-ethanol Active Injected in Test (ppm) | Test Chemistry Active Injected in Test (ppm) | Corrosion Rate After 13 h of Cl Injection (mpy) | % Protection |
|---|---|---|---|---|---|---|---|
| Blank | N/A | N/A | N/A | N/A | N/A | 456 | N/A |
| Dimethyl benzyl ammonium chloride | 1 | 10 | 20 | 0.2 | 2 | 338 | 26 |
| Comp-U | 2 | 20 | 10 | 0.2 | 2 | 252 | 45 |
| Comp-A | 2 | 20 | 10 | 0.2 | 2 | 254 | 44 |
| Comp-N | 2 | 20 | 10 | 0.2 | 2 | 235 | 48 |

Test Methods

Recirculation pump test: A Checkpoint 1250B pump was used to conduct pump tests under selected pressures up to 6,000 psi using a Swagelok pressure relief valve (PRV) in place of the pump outlet check valve. 500 g of the test emulsion sample was recirculated through the pump for two hours.

Disposable filters were made by rolling a 6"×8" strip of 100 Mesh filter cloth into a tube about 1 inch in diameter and 8 inches long then folding over one end and stapling it closed. The tubing from the PRV outlet was inserted into a filter cylinder open end and the filter cloth was wrapped around the tube at the end. The filter and tube were then inserted back into the quart emulsion jar to allow return of the emulsion to the jar and capture of particles larger than 150 microns. After completing the desired test time, the tubing was disconnected from the pump and the emulsion within was drained back into the jar. This tubing was then washed with DI water and the filter was thoroughly washed to remove residual emulsion. The filter was patted dry with paper towels, then placed in a 50° C. convection oven for one hour or more. The filter was then quickly weighed and the increase in weight compared to pre-test filter weight was recorded as the "filter deposit weight".

The pump was disassembled by removing the inlet check valve, removing the outlet PRV spring and retracting the internal shaft, and removing the two bolts that hold the pump to the pump air motor. The packing nut was loosened and the motor and plunger were separated from the pump body. A Buchner funnel with a 100 Mesh screen was held under the pump body and water was washed through the pump and PRV to carry any loose deposits onto the funnel screen. A ⅜" round rod (etc.) was then inserted into the inlet check valve opening in the pump body and the internal cylinder and packing rings were forced out the other side. The weight of a piece of weigh paper was recorded (tared) and the deposits within the pump, on the seals, and on the Buchner screen were transferred to the weigh paper. After several hours of drying at ambient temperature, the deposit weight was recorded as the "pump deposit weight".

Gel permeation chromatography (GPC) Measurements: The following GPC method was used to estimate polymer molecular weight relative to a standard polystyrene latex polymer. The polymer emulsion samples were diluted to 0.05% actives in tetrahydrofuran (THF) and filtered with a 1 μm syringe filter. The samples were then stirred gently for four hours, forming clear, colorless solutions. Chromatography conditions were:

Mobile Phase: THF
Column: Waters Styragel HMW 6E
Standards: Agilent Polystyrene High EasiVials
Flow: 0.5 mL/min
Injection volume: 50 μL The polymer compositions were also blended with alkanolamide dispersants. For the addition of up to 2 weight percent of an alkanolamine such as N,N-bis(2-hydroxyethyl) oleamide, the neat viscous surfactant was added slowly to the rapidly-stirred emulsion followed by mixing for an additional 30 minutes. For greater than 2% surfactant, an amount of salt, typically 1 to 3 weight percent, was first added to the rapidly-stirred emulsion in one charge. The salt dissolved rapidly and helped reduce the viscosity increase of the emulsion when a larger amount of alkanolamide dispersant was added. Water can also be added to reduce the emulsion viscosity if it is above a desired target value.

Drag reduction flow loop test: Effectiveness of the polymer emulsions in reducing pressure loss in a pipe was evaluated using a flowloop of stainless-steel pipe (0.834-inch ID). The loop contained a low shear, variable speed pump, a mass flow meter to control flow rate, a chiller to maintain a constant temperature, and a chemical injection pump to inject the polymer emulsions. All flow loop tests were performed with 60 ppm polymer in kerosene circulated through the loop at a fixed flow rate of 40 KG/minute and at a test temperature of 60° C. A differential pressure transducer was used to monitor pressure drop along a 7-foot long test section. Drag reduction along the test section was calculated as follows:

$$\% \text{ Drag reduction} = \frac{P_0 - P_t}{P_0}$$

where:
% Drag reduction=% pressure loss reduction
$P_0$=pressure loss before chemical was injected and
$P_t$=pressure loss at time t after chemical was injected.
A graph of the percentage drag reduction versus time is presented in FIG. 3 in a flow loop system for copolymers at a concentration of 60 ppm of polymer in kerosene at 60° C. were obtained after neat injection.

Corrosion Testing: Corrosion bubble cell tests were performed to evaluate the corrosion inhibition performance of high molecular weight polymer emulsion chemistries using the following conditions: 80° C., $CO_2$ saturated fluids with 3% NaCl brine (80%) and LVT-200 hydrocarbon (20%) with continuous $CO_2$ sparge, atmospheric pressure. A pre-corrosion stage (i.e. with no corrosion inhibitor) was carried out before 10 ppm of a 20% active of high molecular weight polymer emulsion with 2% 2-mercaptoethanol in solvent blend was added. This equates to 2 ppm of the active chemistry with 0.2 ppm 2-mercaptoethanol being introduced into the test cell. A commonly used quaternary ammonium chloride was included in the tests for comparison. This was assessed at the same active concentration along with the same concentration of 2-mercaptoethanol added to the test. A low concentration was purposefully used in order to differentiate between the chemistries. The percent inhibition was determined by comparing the inhibited corrosion rate at about 13 hours after chemical injection to the corrosion rate of a blank condition after about the same time of exposure to the same conditions in which no chemical was added.

Torque monitor test: This test was used to evaluate self-inversion of the polymer emulsions. Torque monitor tests were performed using the torque monitor setup, including a 2.5" wide×3" high flat stir paddle, an Ace 600 mL jacketed beaker, and a circulating water bath that permitted inversion at constant temperatures. Tests were performed with 375 g of either kerosene or crude oil and with 3 g of emulsion polymer. The polymer solution was mixed at 500 rpm for 60 minutes while the motor torque was recorded. Tests were conducted between 40° C. and 80° C. An increase in the motor torque after the polymer was added to the oil indicated that the polymer composition inverted. Torque monitor tests of 0.3% NaSS copolymer blends with different crude oils are shown in FIG. 4. 3 g of polymer was added to 375 g of fluid at 60° C.

When introducing elements of the present invention or the preferred embodiments(s) thereof, the articles "a", "an", "the" and "said" are intended to mean that there are one or more of the elements. The terms "comprising", "including"

and "having" are intended to be inclusive and mean that there may be additional elements other than the listed elements.

In view of the above, it will be seen that the several objects of the invention are achieved and other advantageous results attained.

As various changes could be made in the above compositions and methods without departing from the scope of the invention, it is intended that all matter contained in the above description and shown in the accompanying drawings shall be interpreted as illustrative and not in a limiting sense.

The invention claimed is:

1. A polymer composition comprising:
an oil-in-water emulsion comprising
an aqueous phase comprising water and an emulsifying surfactant having a cloud point of less than 80° C. and a hydrophilic-lipophilic balance (HLB) of greater than or equal to 8, and
an oil phase comprising a high molecular weight oil-soluble polymer, wherein the oil-soluble polymer comprises a copolymer derived from reaction of a hydrophobic monomer and an ionizable monomer in a weight ratio from about 999:1 to about 80:20.

2. The polymer composition of claim 1, wherein the oil-soluble polymer comprises a copolymer derived from reaction of a hydrophobic monomer and an ionizable monomer in a weight ratio from about 99:1 to about 90:10.

3. The polymer composition of claim 2, wherein the ionizable monomer comprises a styrene sulfonate, styrene sulfonic acid, a vinyl sulfonate, a vinyl sulfonic acid, an acrylamide alkyl sulfonic acid, an acrylamide alkyl sulfonate, a methacrylamide alkyl sulfonic acid, a methacrylamide alkyl sulfonate, a dialkylaminoalkyl methacrylate, a dialkylaminoalkyl acrylate, a dialkylaminoalkyl methacrylamide, a dialkylaminoalkyl acrylamide, or a combination thereof.

4. The polymer composition of claim 3, wherein the ionizable monomer comprises styrene sulfonate, acrylamide tert-butyl sulfonic acid (ATBS), dimethylaminoethyl methacrylamide, or a combination thereof.

5. The polymer composition of claim 1, wherein the hydrophobic monomer comprises propyl acrylate, propyl methacrylate, butyl acrylate, butyl methacrylate, iso-butyl acrylate, iso-butyl methacrylate, tert-butyl acrylate, tert-butyl methacrylate, pentyl acrylate, pentyl methacrylate, isopentyl acrylate, isopentyl methacrylate, hexyl acrylate, hexyl methacrylate, cyclohexyl acrylate, cyclohexyl methacrylate, heptyl acrylate, heptyl methacrylate, octyl acrylate, octyl methacrylate, iso-octyl acrylate, iso-octyl methacrylate, iso-decyl acrylate, iso-decyl methacrylate, lauryl acrylate, lauryl methacrylate, stearyl acrylate, stearyl methacrylate, behenyl acrylate, behenyl methacrylate, 2-ethylhexyl acrylate, 2-ethylhexyl methacrylate, 2-propylheptyl acrylate, 2-propylheptyl methacrylate, benzyl acrylate, benzyl methacrylate, 2-phenylethyl acrylate, 2-phenylethyl methacrylate, tridecyl acrylate, tridecyl methacrylate, iso-bornyl acrylate, iso-bornyl methacrylate, 3,5,5-trimethylhexyl acrylate, 3,5,5-trimethylhexyl methacrylate, 3,3,5-trimethylcyclohexyl acrylate, 3,3,5-trimethylcyclohexyl methacrylate, 2-hydroxyethyl acrylate, 2-hydroxyethyl methacrylate, 2-hydroxypropyl acrylate, 2-hydroxypropyl methacrylate, 2-hydroxybutyl acrylate, 2-hydroxybutyl methacrylate, 2-hydroxyethylcaprolactone acrylate, 2-hydroxyethylcaprolactone methacrylate, dihydrodicyclopentadienyl acrylate, dihydrodicyclopentadienyl methacrylate, ethyldiglycol acrylate, ethyldiglycol methacrylate, $C_{17}$ acrylate, $C_{17}$ methacrylate, vinylbenzylpolyoxyethylene alkyl ether, polyoxyethylene alkyl acrylate, polyoxyethylene alkyl methacrylate, styrene, or a combination or isomeric form thereof.

6. The polymer composition of claim 5, wherein the hydrophobic monomer comprises 2-ethylhexyl methacrylate, 2-ethylhexyl acrylate, styrene, or a combination thereof.

7. The polymer composition of claim 1, wherein the emulsifying surfactant comprises a $C_{10}$-$C_{20}$ alkyl ethoxy sulfate, an alkoxylated alkylphenol, an alkoxylated alcohol, an ethylene oxide/propylene oxide copolymer, a dialkylsulfosuccinate, hydrolyzed polyvinylacetates or a combination thereof.

8. The polymer composition of claim 7, wherein the emulsifying surfactant has a cloud point of less than or equal to 60° C., when the cloud point of the emulsifying surfactant is measured at a concentration of 1 wt. % in deionized water.

9. The polymer composition of claim 7, wherein the emulsifying surfactant comprises a lauryl ethoxy sulfate, an ethoxylated octylphenol, an ethoxylated nonylphenol, an ethoxylated branched secondary alcohol, an ethoxylated alkyl alcohol, an ethoxylated/propoxylated alkylphenol, a dioctyl sulfosuccinate, or a combination thereof.

10. The polymer composition of claim 9, wherein the emulsifying surfactant has a HLB of equal to or greater than 8.

11. The polymer composition of claim 10, wherein the emulsifying surfactant comprises a sodium lauryl ethoxy sulfate having an average of 2 to 6 ethylene oxide units per molecule, an ethoxylated octylphenol having an average of 5 to 10 ethylene oxide units per molecule, an ethoxylated nonylphenol having an average of 6 to 12 ethylene oxide units per molecule, an ethoxylated branched secondary alcohol having an average of 6 to 10 ethylene oxide units per molecule, an ethoxylated isodecyl alcohol having an average of 4 to 8 ethylene oxide units per molecule, a dioctyl sulfosuccinate, or a combination thereof.

12. The polymer composition of claim 1, further comprising a dispersant, wherein the dispersant is an alkanolamide dispersant comprising N,N-bis(2-hydroxyethyl) oleamide.

13. The polymer composition of claim 1, further comprising a metal salt, an ammonium salt, or a combination thereof, preferably, wherein the ammonium salt comprises ammonium acetate or the metal salt comprises calcium chloride.

14. The polymer composition of claim 1, further comprising an alcohol, a glycol, a polyglycol, or a combination thereof.

15. The polymer composition of claim 14, wherein the glycol is ethylene glycol.

16. The polymer composition of claim 1, further comprising a lubricant; wherein the lubricant is a polydimethyl silicone agent.

17. The polymer composition of claim 1, further comprising a pH neutralizer, wherein the pH neutralizer comprises sodium hydroxide, potassium hydroxide, ammonium hydroxide, or a combination thereof.

18. The polymer composition of claim 1, wherein the oil-soluble polymer has a concentration of from about 20 wt. % to about 45 wt. % in the polymer composition, based on the amount of the oil-soluble polymer, emulsifying surfactant, and water.

19. A method of reducing the drag associated with transporting a hydrocarbon fluid through a subsea flowline comprising transporting the polymer composition of claim 1 through an umbilical line to the subsea flowline and contacting the polymer composition with the hydrocarbon fluid at an injection point.

20. A method or use of the polymer composition of claim 1, for inhibiting corrosion, inhibiting scale deposition, inhibiting asphaltene deposition, inhibiting paraffin deposition, inhibiting hydrate formation, improving flow of the fluid, breaking an emulsion, improving flow of the fluid, stabilizing a clay, inhibiting bacteria growth, providing a salt, modifying permeability of a subterranean reservoir, scavenging sulfide, intensifying inhibition of corrosion, controlling pH, acting as a surfactant, controlling fluid loss, providing chelation, foaming, defoaming, providing emulsion stability, controlling iron, providing solvation, reducing friction, or a combination thereof.

* * * * *